United States Patent
Whitehead et al.

(10) Patent No.: US 9,268,797 B2
(45) Date of Patent: Feb. 23, 2016

(54) SYSTEMS AND METHODS FOR ON-LINE BACKUP AND DISASTER RECOVERY

(71) Applicant: Zetta, INc., Sunnyvale, CA (US)

(72) Inventors: Jeffrey Whitehead, Sunnyvale, CA (US); Louis Montulli, Sunnyvale, CA (US); Jason Harrison, Sunnyvale, CA (US); Andrew Eckhardt, Sunnyvale, CA (US); Casey Cook, Sunnyvale, CA (US); Ray Thro, Sunnyvale, CA (US); Angus Scott, Sunnyvale, CA (US); Harliv Singh, Sunnyvale, CA (US); Rich Webster, Sunnyvale, CA (US)

(73) Assignee: ZETTA INC., Sunnyvale, CA (US)

( * ) Notice: Subject to any disclaimer, the term of this patent is extended or adjusted under 35 U.S.C. 154(b) by 574 days.

(21) Appl. No.: 13/725,841

(22) Filed: Dec. 21, 2012

(65) Prior Publication Data

US 2014/0181579 A1  Jun. 26, 2014

(51) Int. Cl.
| | | |
|---|---|---|
| G06F 7/00 | (2006.01) | |
| G06F 17/30 | (2006.01) | |
| G06F 11/34 | (2006.01) | |
| G06F 11/14 | (2006.01) | |

(52) U.S. Cl.
CPC ...... *G06F 17/30289* (2013.01); *G06F 11/1402* (2013.01); *G06F 11/1451* (2013.01); *G06F 11/1456* (2013.01); *G06F 11/1448* (2013.01); *G06F 11/1464* (2013.01); *G06F 11/3485* (2013.01); *G06F 2201/83* (2013.01)

(58) Field of Classification Search
CPC ............ G06F 11/3616; G06F 11/1076; G06F 17/330212; G06F 1/30215; G06F 17/30575
USPC ................. 707/801, 650, 634, 638, 654, 659, 707/694–695, 649, 690
See application file for complete search history.

(56) References Cited

U.S. PATENT DOCUMENTS

| | | | |
|---|---|---|---|
| 5,991,777 A * | 11/1999 | Momoh et al. | |
| 7,433,300 B1 * | 10/2008 | Bennett et al. | 370/216 |
| 7,814,050 B2 | 10/2010 | Mehta | |
| 8,082,231 B1 * | 12/2011 | McDaniel | G06F 11/1453 707/681 |
| 8,595,457 B1 * | 11/2013 | Kumar et al. | 711/165 |
| 2006/0248047 A1 * | 11/2006 | Grier et al. | 707/2 |
| 2007/0100913 A1 * | 5/2007 | Sumner | G06F 11/1453 |
| 2009/0150629 A1 * | 6/2009 | Noguchi et al. | 711/162 |
| 2009/0157958 A1 * | 6/2009 | Maroney et al. | 711/114 |
| 2010/0332456 A1 * | 12/2010 | Prahlad et al. | 707/664 |
| 2012/0042055 A1 | 2/2012 | Agarwala | |
| 2012/0069131 A1 * | 3/2012 | Abelow | 348/14.01 |
| 2012/0116937 A1 | 5/2012 | Van Biljon | |
| 2013/0117580 A1 * | 5/2013 | Chin | 713/300 |
| 2013/0204849 A1 * | 8/2013 | Chacko | 707/692 |
| 2013/0212671 A1 * | 8/2013 | Wang et al. | 726/16 |
| 2014/0108717 A1 * | 4/2014 | Tian et al. | 711/108 |

* cited by examiner

OTHER PUBLICATIONS

Minqu et al., "Security and Privacy in Cloud Computing: A Survey", 2010 Sixth International Conference on Semantics, Knownledge and Grids, IEEE Computer Society, pp. 105-112.*

*Primary Examiner* — Mariela Reyes
*Assistant Examiner* — Linh Black
(74) *Attorney, Agent, or Firm* — Tran & Associates

(57) ABSTRACT

A data recovery system includes a plurality of customer computers to be backed-up, each customer computer running a client software to communicate back-up data files; a system management platform coupled to the client software over the Internet, the system management platform receiving inputs from a web user portal to control operations of the client software and the system management platform to back up the customer computer; and two or more data storage silos, each including: a plurality of storage directors communicating with the client software; and a clustered data storage array.

18 Claims, 22 Drawing Sheets

FIG. 12A

ZettaMirror Systems » Client Download

ZettaMirror Clients Download

ZettaMirror is an application that efficiently synchronizes directories from your local file system to Zetta, ensuring that Zetta always houses an up-to-date and protected offsite second copy of your critical data. Learn More.

Help topics
What is ZettaMirror?
What is a snapshot?

Latest Available Client Versions

| Operating Platform | Platform Version | Client Version | Actions |
|---|---|---|---|
| Mac | OS X Server 10.7 (64-bit) | 3.0.27055 | Download |
| Linux | Red Hat (32-bit) | 3.0.27637 | Download |
| Linux | Red Hat (32-bit) | 3.2.30315 (Beta) | Download |
| Linux | Red Hat (64-bit) | 3.0.27637 | Download |
| Linux | Red Hat (64-bit) | 3.2.30315 (Beta) | Download |
| Linux | SUSE (32-bit) | 3.0.27637 | Download |
| Linux | SUSE (32-bit) | 3.2.30315 (Beta) | Download |
| Linux | SUSE (64-bit) | 3.0.27637 | Download |
| Linux | SUSE (64-bit) | 3.2.30315 (Beta) | Download |
| Windows | Server 2003 (32-bit) | 3.2.31023 | Download |

Refresh

Showing 44 Clients

Zetta Systems Daily Digest For: ZettaMirror Sales Demo 01

Systems Activity Summary for: 12/04/12 18:49 - 12/05/12 18:49 UTC

Number of Systems: 15 (5 had alerts)
Total Items Processed: 12/21
Total Bytes Written: 12 MB
Total Errors: 2
Total Warnings: 7

| System Name | Last Sync Activity | Sync Errors | System Warnings | System Duration | System Processed | Bytes Written | Avg Speed | Files Processed |
|---|---|---|---|---|---|---|---|---|
| smackey-PC Upgrades: 3.2.3.18303 | system load exceed number DISCONNECTED | | | | | | | |
| Danny macs mini osx10.8 | DISCONNECTED | | | | | | | 1707 |
| ESdemo-Svr Upgrades: 3.2.3.18303 | Sync Completed With Warning(s) | 0 | 1 | 1m30s | 523 MB | 1 MB | 103 KB/s | 1871 |
| MilesSvr-PC Upgrades: 3.2.3.18303 | Sync Completed With Warning(s) | 0 | 3 | 2m30s | 7 GB | 7 MB | 71 KB/s | 128 |
| Jill-s-PC Upgrades: 3.2.3.18303 | Sync Completed With Warning(s) | 0 | 3 | 15s | 17 MB | 10 KB | 4 KB/s | 852 |
| Ash-system Upgrades: 3.2.3.18303 | Sync Completed | 0 | 0 | 30s | 4 GB | 48 KB | 22 KB/s | 869 |
| hising/h-salesdemo Upgrades: 3.2.3.18303 | Sync Completed | 0 | 0 | 15s | 608 MB | 48 KB | 15 KB/s | 647 |
| iosi-thinkpad | Sync Completed DISCONNECTED | 0 | 0 | 1m4s | 520 MB | 52 KB | 865 B/s | 3240 |
| JRaki-SVR(3) Upgrades: 3.2.3.18303 | Sync Completed | 0 | 0 | 3m19s | 5 GB | 736 KB | 36 KB/s | 368 |
| SchNitro-Deux Upgrades: 3.2.3.18303 | Sync Completed | 0 | 0 | 1m | 3 GB | 32 KB | 8 KB/s | 9 |
| Server 2008 r1 Upgrades: 3.2.3.18303 | Sync Completed | 0 | 0 | 20s | 570 KB | 2 KB | 630 B/s | 121 |
| Server-2008SQLtest Upgrades: 3.2.3.18303 | Sync Completed | 0 | 0 | 7s | 4 MB | 442 KB | 117 KB/s | 1957 |
| Garry-Laptop Upgrades: 3.2.3.18303 | Sync Completed | | | | 2 GB | 2 MB | 360 KB/s | |
| Erik_Macbook | Idle | | | | | | | |
| shyteja-PC Upgrades: 3.2.3.18303 | Idle Suspended | | | | | | | |

FIG. 12H

SYSTEMS AND METHODS FOR ON-LINE BACKUP AND DISASTER RECOVERY

FIELD OF INVENTION

The invention relates to systems and methods for disaster recovery and/or maintaining back up files for servers on a computer network.

BACKGROUND OF THE INVENTION

As companies today become more accustomed to storing important company information on their data network, the value of these networks and the data they store continues to grow. In fact, many companies now identify the data stored on their computer network as their most valuable corporate asset.

Today most backup systems operate by having the network administrator identify a time of day during which little or no network activity occurs. During this time the network administrator turns the network over to a backup system and the data files stored on the computer network are backed up, file by file, to a long term storage medium, such as a tape backup system. Typically the network administrator will back up once a week, or even once a day, to ensure that the backup files are current.

Although such a backup process may work well to create a copy of the data stored on the network, it is a time consuming and labor intensive process. Moreover, it is a cumbersome process that often is inappropriate in many environments. For example, as more and more computer networks begin to operate twenty-four hours a day seven days week, it is continuously more difficult for the system administrator to identify a block of time during which the majority of network resources may be turned over to the backup procedure. Moreover, as computerized network systems begin to store more information as well as information that changes regularly during the course of the work day, the value of a backup system which only backups once a week or once a day is fairly reduced. In fact many companies now rely on the corporate network to store almost all of its business information, and the loss of even a portion of the information stored on the network during the course of a day may result in a substantial cost for the company. Accordingly, systems which only backup periodically are of a reduced value to a company.

Computer backups are performed using several strategies. The simplest entails a complete transfer of all data and meta-data (such as time stamps, ownership, and access rights) to a target which is simple but redundantly transfers data already present on the target at potential high expense. Incremental backups transferring actual changes or a more manageable subset are also possible. Common mechanisms for determining an appropriate increment include archive bits and modification time stamps. Archive bits are set by the operating system on any change and reset by the backup software but preclude use for multiple backup systems and don't narrow down the types of change. Modification time stamps are set by the operating system but can sometimes be adjusted by user software.

Transfer-mechanisms vary often involve common file formats. Such file formats often intermix data and meta-data which make meta-data separation for other processing expensive. The contents of such files are also often constrained to what's needed for a specific operating system.

Many software programs implementing such backups use only one single thread of instructions which precludes having multiple simultaneous reads and writes which speed backups with increased input/output (I/O) throughput and reduced latency effects from performing multiple IOs simultaneously to/from the same and different end-point. Parallel I/Os to the same end-point can have higher throughput when the operating system and firmware can re-order them for efficiency (as on spinning magnetic and optical disks where they can execute in physical order) or overlap latency with command execution (notably on a network connection) to reduce its effect. Parallel I/Os to different end-points (such as a network target and local storage, or multiple mass storage devices like in a disk array) can approach the aggregate throughput of the devices as opposed to the average when performed serially.

Moreover, although the current backup systems work well for putting data on to a long term storage media system, they often store data sequentially on to media, like a magnetic tape, losing the file structure of the data, and making it difficult to retrieve information without having to reinstall all the data previously stored on the tape. Thus, if a portion of the data is lost, it is often difficult to restore just the data that was lost, and often the system administrator is forced to decide whether it is worth the cost of retrieving the lost portion of the data.

Many backup systems do not provide an easy way to validate that the backup contents are usable (problems such as a disk or tape error can preclude this) and match the source. U.S. Pat. No. 7,644,113 discloses systems and methods for continuous back up of data stored on a computer network. The system includes a synchronization process that replicates selected source data files data stored on the network and to create a corresponding set of replicated data files, called the target data files that are stored on a backup server. This synchronization process builds a baseline data structure of target data files. In parallel to this synchronization process, the system includes a dynamic replication process that includes a plurality of agents, each of which monitors a portion of the source data files to detect and capture, at the byte-level, changes to the source data files. Each agent may record the changes to a respective journal file, and as the dynamic replication process detects that the journal files contain data, the journal files are transferred or copied to the backup server so that the captured changes can be written to the appropriate ones of the target data files.

SUMMARY

In one aspect, a back end distributed metadata store saves any types of metadata, even data unsupported by the underlying back end file system, in sidecar files for any type of attribute. Applications include extended ACL's, long file names, document tags or classifications, among others.

In another aspect, systems and methods are disclosed for improved Backup/Replication Performance via Locally Distributed Change Detection. Traditional backup systems talk to a central server which has a catalog of what has been backed up. The instant client software 10, as a replication solution, needs to rapidly identify what files have changed. By making the simplifying assumption that all writes to the given replication destination sub-tree are going through the client software, the Manifest files are a local representation of what the remote (replicated/back end) state was. Therefore, the client software only has to compare the defined job to the manifest (avoiding network round trip) to determine what needs to be transmitted to the back end.

In yet another aspect, Asynchronous Replication Correctness Validation can be done. Using the uploaded manifest file, metadata (and optionally on-disk payload via hash compare) is verified and compared with the on-disk state. If a discrepancy is found, manifest is wiped or patched and pushed down, and the next sync job resolves all discrepancies. This second check is a way of performing complete end to end validation, like a restore test, without having to do an actual restore. Alternate mechanisms for asynchrony replication can be done. For example, event driven systems can be used to scale large files with backup driven by finite automata. Multi-process can also be used for failure domain constraint.

In a further aspect, the system minimizes network bandwidth used for replication/backup. As network bandwidth is generally the key limiting resource for an Internet delivered backup or replication service, the client software goes through a number of steps to ensure that the minimum amount of data needs to be transmitted. In one implementation, the manifest is used to identify locally what files have changed. Next, a local sub-file signature cache is consulted to detect insertions, removals, and rearrangements of data in files, so that only the changed portion of the file is transmitted. Next, the patch segments generated are compressed with standard compression libraries, the payload is encrypted with SSL, and the payloads are transferred in 10 MB chunks over WebDAV, which an HTTP extension designed for moving large amounts of data. Additionally, multiple threads are run in parallel, overcoming slowness or limitations in TCP window scaling adjustments, or handling network "long fat," (high latency high bandwidth) network connections. At the receiving end the WebDAV server intelligently decrypts, expands the patch sets, and stamps them down onto the file system. This results in the transfer efficiency of an incremental backup, but generates a full backup with snapshots going back in time for version history. Notably, this also results in a mountable/usable file system, as opposed to a backup "blob," that requires processing by the backup software before it is transformed back into a usable state. This process is followed for each individual file (in parallel with other files. The system loops over the sub file difference, patches phase to limit memory foot print. The system can parallelize patch processing within a single source file. Additionally, multiple threads are run in parallel, overcoming slowness or limitations in TCP window scaling adjustments, or handling network "long fat," (high latency high bandwidth) network connections.

In yet another aspect, simultaneous generation of a local backup on a Windows or NFS share is done for rapid restore purposes, for mission critical or especially large files, in addition to transferring to the system. Doesn't require an appliance—any mountable share (or USB drive, for example) is a valid target. Efficient access to version history is available by using the local copy as a "seed," and accessing snapshot data and transmitting only the patch sets required to revert to any particular version.

In a further aspect, automatic provisioning of new customers or trial volumes, including administrative account setup, storage provisioning, and enabling of billing and monitoring is all done with no human in the loop.

In another aspect, State Consistent Replication is done. By leveraging source side snapshots (whether VSS, LVM, or on a NetApp filer), snapping the source data, performing the sync, and then snapshotting on the system side results in an identical data set on the system side. This is the same net result as products (and associated claims) such as NetApp SnapMirror or EMC Replication Manager, but operating in a very different mechanism (the aforementioned are block based tracking). The advantage is that it supports heterogeneous storage (from any vendor to the system, or from any vendor to any vendor).

In a further aspect, real time billing and metrics reporting are done. The backend has a scalable system for collecting, rolling up, acting on, and displaying an arbitrary set of metrics. Current usage is for customer bandwidth and footprint metrics, but this can be extended over time.

Advantages of the system may include one or more of the following. The system supports off-site storage of critical data. The system provides security, backup time, management and most important, recovery time. The system uses the cloud and client to cloud communications agents using the Web Distributed Authoring and Versioning (WebDAV) extension to the HTTP protocol. WebDAV allows communications between customer equipment and the cloud data centers to be done in a rapid multi-thread mode which allows the full available customer bandwidth to be utilized, shrinking backup and recovery time at the protocol level. In addition, data is de-duplicated and compressed prior to transmission, further reducing backup and recovery time. A local copy of a file version fingerprint is kept on the customer equipment which can be used to quickly determine if file data has changed. Incremental change data is transmitted to the cloud, further reducing transmission times. The system is highly secure and security starts with encryption of data prior to transmission and at rest. Since businesses will different views of IT's involvement in the recovery process of entire systems or a particular file version, lightweight directory access protocol (LDAP) is used to determine who has privileges to access what. An administrator can establish the service with LDAP for the customer defaults to that admin for access to the customer data. After that, and depending on how much care and feeding the IT organization wants to donate to the process, it is possible for end users to be able to access and recover data that is, for example, on their personal laptop. Protection technology is automated with configurable frequency and retention settings. Because of the communications efficiencies, the expense and management of a dedicated backup appliance is not necessary. It takes about fifteen minutes to set up and establish the service. In case of a disaster, the data is instantly available via a web browser interface. The same interface is used to manage all machines via a single pane. The system makes cloud data protection and disaster recovery feasible for the mid-market with compelling features, no capital expense and low, predictable operating expenses.

Other advantages of the system may include one or more of the following. The system provides on demand storage—immediately scale according to a user's growth, compliance and user needs. The system provides a real file system backend—replication allows for mounting. A standards based file protocol access is used. The system is secure—encryption end-to-end from the user's location to the system. Data received is hashed on receipt and verified while stored with the system. Users can access native file system data directly without complicated restore process. The system is fast and can move data efficiently, leading to reduced backup windows. The system can perform fast change detection, and the WAN-optimized software-based data mover includes bandwidth efficiency throttling. Sub-file change detection can be done, and strong checksums are kept on every file. Reverse incremental backup can be done through a series of full backups that are fully versioned. Snapshots are kept for recovery point objectives (RPO), retention schedules and compliance requirements. Through block level snapshot deltas and sub file change detection, the system is very space efficient. Features include:

Automated—'set and forget' protection
    Automatic upgrades
    Multi-platform support including Windows, Linux and
      MAC systems Near instant deployment—A fully SAS based model allows customers to start protecting data within minutes Managed Service—24/7/365—The system services team proactively managing the data protection The system utilizes award-winning technology and infrastructure:

Web-based System Management Portal (SMP) to manage, configure and report on data protection jobs Central View—Web-based single view across all data protection targets—remote locations, servers, end-users Geographically diverse data centers to select from SAS 70 Type II audited service, technology and datacenters Native connectors—Enterprise connectors for Databases Netapp replication Other advantages of the system may include complete data protection to small and mid-sized companies by delivering each of the four components of data protection: online backup, disaster recovery, offsite data storage, and compliance. Online backup is a simple and automated way to backup the company's servers and laptops and is the first piece of the data protection puzzle. With the system, incremental backups are completed quickly thanks to de-duplication and multi-threaded data transfer over https. Disaster recovery is an important part of data protection—since backups are worthless if they can't be recovered. With the system's snapshot & replication approach, single files are just as easy to recover as whole file systems or databases. Offsite data storage is another component of data protection that ensures data loss in the data center or company headquarters doesn't also corrupt or destroy backup data. The system allows you an even greater level of data protection with the option to have the data replicated in both West Coast and East Coast data centers.

The system has three disaster recovery solutions built-in. To recover data an IT professional can use: the software client, a web browser, or a mapped network drive. To recover with the software agent simply use the "Restore Using The system Mirror" option when you right click on a file or directory from the admin interface. This is the most frequently used of the system's disaster recovery solutions. The web-based recovery will be the first of the disaster recovery solutions on the priority list if the data center has been damaged by a fire or tornado, for example. All it requires is logging into the system management portal, selecting the system you want to restore, then the snapshot of that system you want, and then click the blue URL link. A list of files for that system will then load in a new browser tab. Mapped network drive based disaster recovery solutions are built into the operating system such as Windows Vista and Windows 7.

BRIEF DESCRIPTION OF THE DRAWINGS

FIGS. 12A-12H show exemplary user interface screens.

DESCRIPTION

Figure 1A:
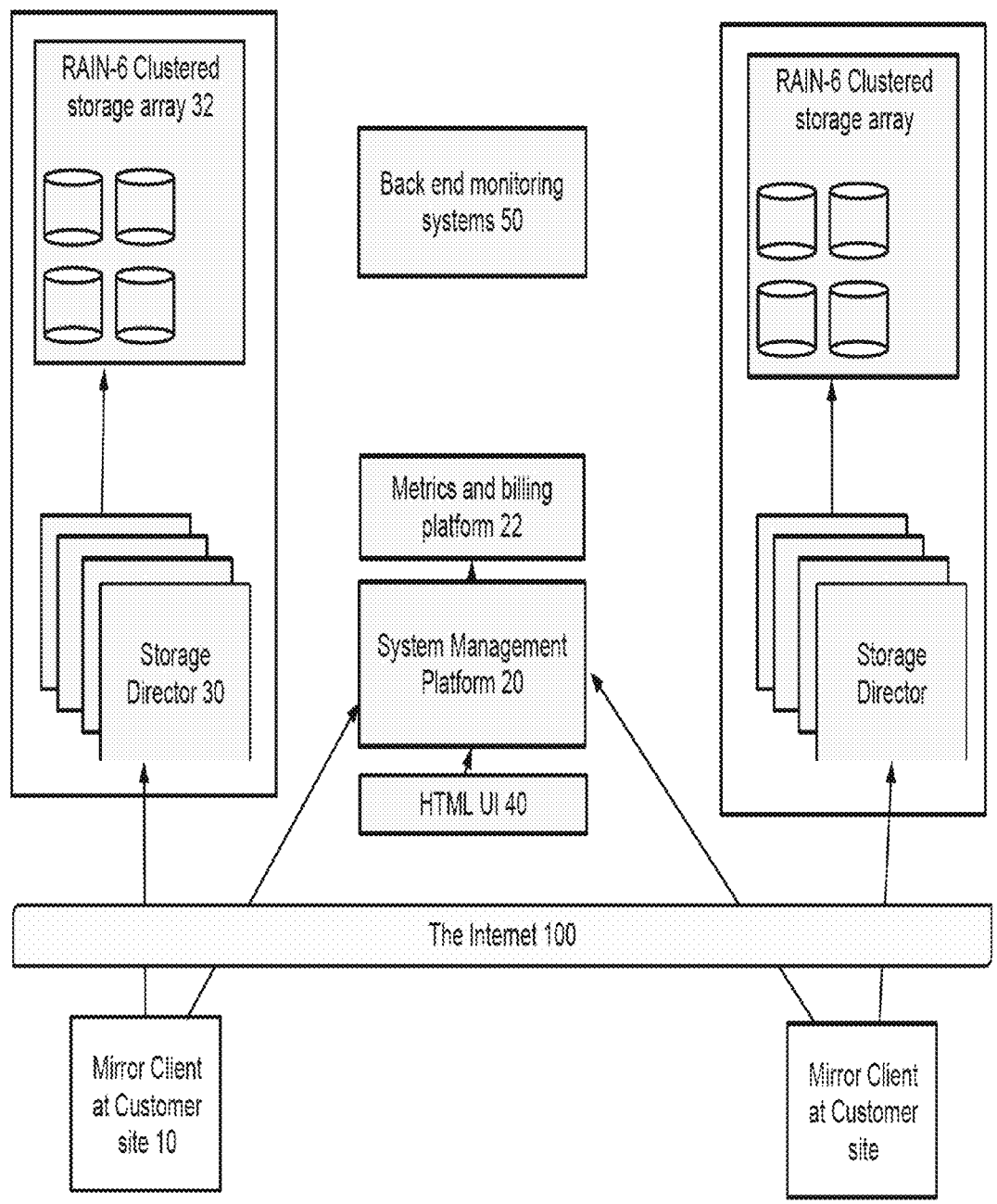
FIGS. 1A-1B show exemplary disaster recovery and backup systems.

FIG. 1A shows an exemplary disaster recovery and backup system. The system includes a plurality of client software 10. The software 10 runs natively on customer systems and interfaces directly with the user's computer file system. The software 10 is able to perform network file reads and writes, change detection, snapshots, database serialization and many more backup and restore functions and is remote controlled by the a System Management Platform 20 service over the Internet 100.

The configuration of the client software 10 is done using a web user interface 40. Once configured, the client software 10 communicates over the Internet 100 to the System Management Platform (SMP) 20 that acts as a central director for all activities. Configuration and user monitoring of the overall system is performed there through an overlaid HTML UI 40. Once configured the SMP 20 interfaces with agents at the client software 10 to initiate backup and restore jobs and other associated tasks. The web interface 40 can be an HTML UI that interfaces with the System Management Platform 20 and allows users to interact with the SMP 20 with a web browser to configure, monitor and manually initiate jobs. The HTML UI also acts as a central gateway to other HTML interfaces such as a Web File Browser hosted on the application servers.

Back up data from the client's computer is provided to storage directors 30 that send the information to a data storage array 32. A metrics and billing platform 22 communicates with the system management platform 32 to bill customers. A back end monitoring system 50 ensures that systems operate with a predetermined uptime.

One embodiment provides cloud backup security features such as:

1. The data is encrypted both in transit and at rest.
2. The data is stored using RAIN-6 (Redundant Array of Independent Nodes) that ensure that even if two entire storage nodes go down, not just two disks, the data is still available.
3. File level hashing to validate that all the data is free of corruption so it can be restored when needed.
4. Storage in SAS70 Type II data centers under audited service procedures.
5. Data immutability and preservation procedures for compliance with regulations such as SEC Rule 17-4a.
6. Service Auditors to the Statements on Standards for Attestation Engagements No. 16 (SSAE-16) certified service
7. User and group level access control to limit data access.
8. Authentication and logging of all access to data.

Figure 1B:
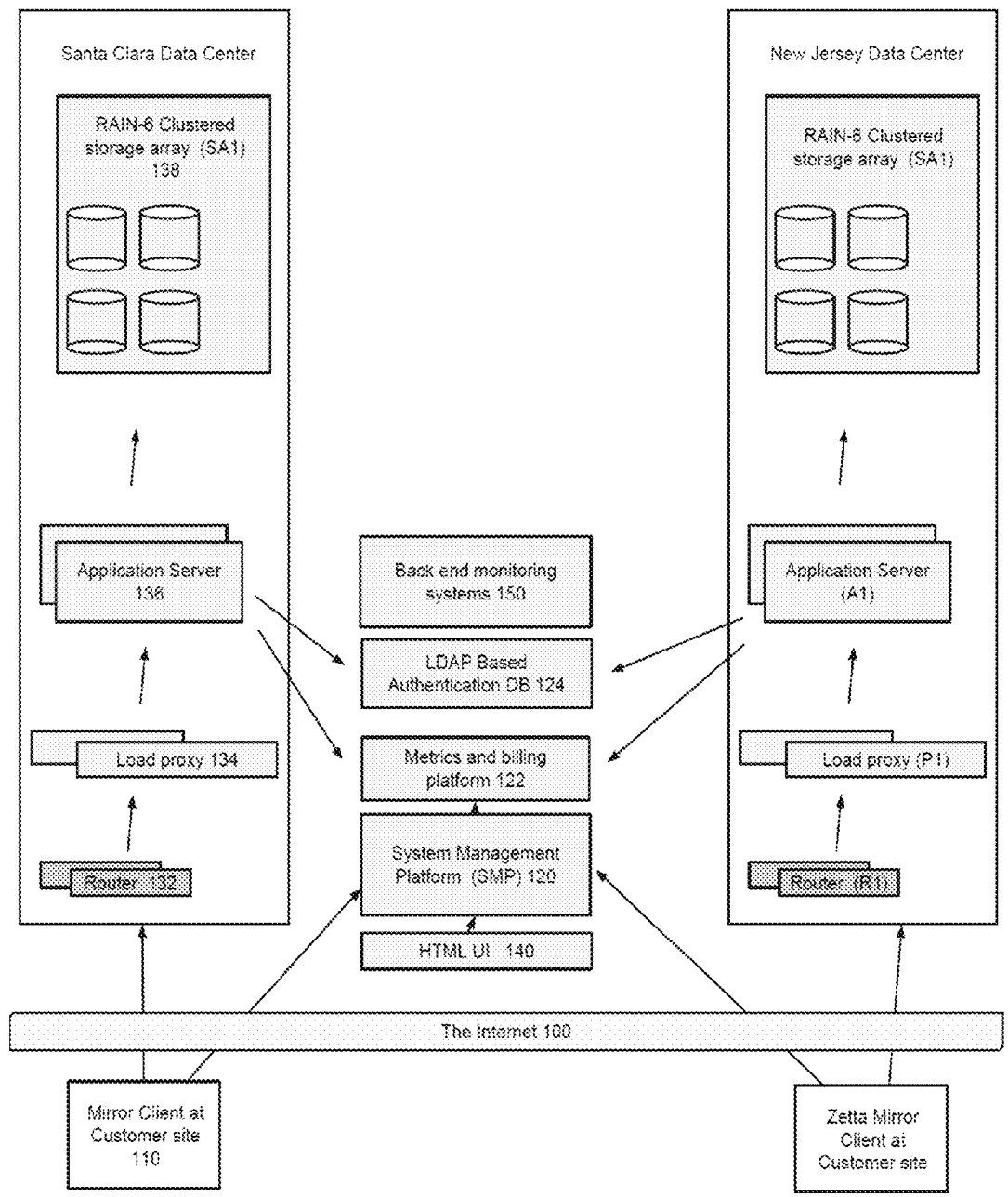

FIG. 1B shows a second embodiment of the disaster recovery and backup system. In this system a plurality of data centers are provided to provide high availability. Each data center has routers 132 that communicate to load proxy machines 134 to distribute incoming requests to a plurality of application servers 136. In one embodiment, the routing infrastructure is based on 10G technology and is redundant at every level. In this embodiment, Load Proxy servers 134 receive incoming requests, validate the credentials in the request against LDAP, and route them to the application server that hosts the volume. Proxies are deployed as HA pairs. HTML based applications can be hosted here to provide seamless access for the user using a web browser.

The servers 136 communicated with a clustered storage array 138. The application servers 136 handle the bulk of the system load by providing a file system interface to the underlying data storage system 138. Most file system functions are provided through a WebDAV interface, but several custom additions were necessary to optimize the services. The application server also includes SSD for read cache acceleration. Application servers are deployed in HA pairs, and "own," one or more pools of disks, from which volumes are thin-provisioned.

Client software 110 communicates with the router 132. For management, the client software 110 also communicates with a system management platform (SMP) 120, which is controlled over a web interface 140. A metrics and billing platform 122 receives usage inputs from the application servers 136 and the SMP 120. In one embodiment, the Metrics and billing platform 122 is a custom client/server software built upon traditional SQL DB technologies. Frequent samples of storage metrics are saved and are available for instant and historical analysis over any time period. The system has custom built the billing metrics systems using traditional SQL database methodology to produce a very reliable yet scalable system. A scalable and customizable billing infrastructure is used that allows the system to take advantage of a large number of flexible subscription billing features. An LDAP based authentication database 124 also receives input from the application servers 136. The LDAP servers store and authenticate users for every transaction.

A back end monitoring system 150 ensures that systems operate with a predetermined uptime. The monitoring system 150 includes automated programs that monitor the health of thousands of individual hardware and software elements within the system. In one embodiment, an anonymous search operation is done in a root directory of each server every ten seconds. In another embodiment, Directory Proxy Server 6.0 has a number of properties that can be configured to monitor its backend servers. In yet other embodiments, the monitoring system 150 includes a TCP health monitor that interacts with the TCP port associated with the application and verify that a connection could be made, signifying that an application was running and listening for users. A typical example would be to attempt to attach to TCP port 80 of a web server. A successful connection to the appropriate port indicates server health that is better than a simple network PING that an application listens on the server.

In one implementation, the data storage array 32 is a RAIN-based storage and protection systems that includes RAIN nodes, IP-based internetworking, and RAIN management software. The RAIN nodes can be 1 U servers that provide about 1 terabyte of serial ATA (SATA) disk storage capacity, standard Ethernet networking and CPU processing power to run RAIN and data management software. Data is stored and protected reliably among multiple RAIN nodes instead of within a single storage subsystem with its own redundant power, cooling and hot-swap disk-drive hardware. The RAIN nodes are physically interconnected using standard IP-based LANs, metropolitan-area networks (MAN) and/or WANs. This lets administrators create an integrated storage and protection grid of RAIN nodes across multiple data centers. With MAN and WAN connectivity, RAIN nodes can protect local data while offering off-site protection for data created at other data centers. The RAIN management software lets RAIN nodes continuously communicate their assets, capacity, performance and health among themselves.

RAIN management software automatically can detect the presence of new RAIN nodes on a new network, and these nodes are self-configuring. The management software creates virtual pools of storage and protection capacity without administrative intervention. It also manages all recovery operations related to one or more RAIN nodes becoming unavailable because of RAIN node or network failures. RAIN nodes do not require immediate replacement upon component failure because lost data is automatically replicated among the surviving RAIN nodes in the grid.

In one embodiment, the data storage array 32 or 138 is a RAIN-6 clustered storage array. The redundant Array of Independent Nodes (RAIN) architecture enables the system to have an entire node of disks or up to 50% of hard drives fail without experiencing any difficulty or system failure. RAID focuses on protecting hard drives from failure, while RAIN focuses on protecting the entire node, or server, cluster from failure. With RAIN technology not only are systems protected from a single hard drive failure, but also are protected from other hardware failures such as power supply, mother board, CPU, RAM or any other internal component. RAIN technology can protect up to 50% (n/2n) of the hard disk involved across all connected nodes. As more nodes are added the fault tolerance of the entire node cluster increases. More nodes mean higher performance and availability and increased scalability. High performance is realized by writing data first to Solid State Drives then to the SATA Drives.

On exemplary cluster architecture is built on the clustered file system and enables multiple engine nodes to share volumes on a group of SAN devices and provides a global naming system, which evenly distributes access requests onto the engine nodes by running a load balance algorithm. It also provides a set of file lockout mechanisms, ensuring that all engine nodes can access data on the same volume. The cluster architecture and load balance design eliminate risks from node failures, so even when a server in a data center fails, data access service is uninterrupted.

With RAIN architecture, independent servers in the cloud make complete copies of the user's data. This data is protected because it is copied from machine to machine in the cloud and the servers check that each copy is perfect. If one of those servers fails, user data does not disappear. The others detect the loss and make additional copies through a process called regeneration. Most storage systems use a different architecture, known as RAID, or Redundant Array of Inexpensive/Independent Disks. The RAID method does something similar to RAIN, but at the disk or machine level. The advantage with the RAIN architecture of the cloud is that it is much more scalable: Protection is happening at the server level, not down at the disk level. The RAIN method is also more reliable. An entire node could fail, but a user would still have access to his or her data because it would be replicated on additional nodes.

The three components of the online server backup are the backup itself, system snapshots, and replication of the data offsite. The system's server backup solution uses the lightweight client software, with specific plugins for file servers, Exchange, SQL, and VMware and multi-platform support for 18 different flavors of Windows, Linux, and Mac. Server backup using the client software enables automated incremental backups with configurable retention settings.

Snapshots are Versioning-Enabled Backup copies that capture the state of the data at a point in time. Snapshots allow for server backup with a consistent backup state across the entire system, with granular versioning. The system's snapshots use byte-level change detection to optimize the amount of data being transferred across the network during each daily server backup job.

The system pairs snapshots with replication to provide the most efficient disaster recovery capability. Rather that storing the snapshots compressed, or in a proprietary format, replication makes the backup a fully instantiated file system—in its native format—so disaster recovery becomes as easy as pulling a file off a file server.

The system may be integrated into a conventional computer network system that comprises conventional network elements and nodes such as client stations, work stations, printers, hubs, routers, and other conventional data network equipment. For example the depicted servers may be conventional files servers of the type commonly employed with computer networks and can comprise a PC compatible work station running the windows NT, UNIX, Linux, or other operating system and having sufficient random access memory and persistent memory to operate efficiently as a server systems. Similarly, the client station can be a conventional client workstation such as a PC compatible computer system running the windows 8, Linux, or UNIX operating system or any suitable operating system. Additionally, the client station can comprise an alternative client system such as a hand-held device, a standalone client system such as kiosks, or any other suitable client device. In FIG. 1 the network is the Internet, but can also be a local area network, however it will be apparent to one of ordinary skill that the systems and methods described herein can be employed with wide area network, a distributed network, including the Internet or any other suitable network system.

It will be understood by those of skill in the art, that these data storage device element may be conventional database systems, as well as conventional file systems, such as the Windows file system, or the Unix File system, both of which have directories of data file that may be backed up by the systems described herein. Moreover, the backup systems described herein will operate with data storage devices that store different formats of data and different types of files. For example, the data storage devices may store data files, executable files, registry information, database structures and other conventional data formats and data types. Moreover, FIG. 1A shows these stores of data as local to the server, however, it will be understood that such data stores may also be distributed across a plurality of locations and devices. The data may be physically stored on any suitable memory system including a cache memory system, a random access data memory, or a persistent data memory, such as a hard disk drive, RAID system, tape drive system, floppy diskette, or any other suitable system. The system depicted in FIG. 1A depicts the data storage devices as physically separate from the servers, however, it will be understood by those of ordinary skill in the art that in other embodiments the data storage devices can be integrated into the system, such as an internal hard drive device.

The system can also work with a tape library which may be a conventional tape library system of the type commonly employed for backing up data on a computer network. In one particular embodiment, the tape library system is a blank tape library system manufactured by the Quantum corp. of Milpitas, Calif. However, it will be apparent to those of ordinary skill in the art that other tape library systems may be employed without departing from the scope of the invention. Optionally, the tape library may include a controller that performs a tape expiration process to rotate selectively the use of tapes in the library and which is based on the loader capacity of the tape library. Specifically backup of data to the automated tape library, which can be a conventional juke box device that, can happen in a manner wherein after multiple or incremental system backups, essentially all available tape space is employed. Thus there is no more blank tape available for recording information. Rather than have a human remove the tape, and automatically reuse the oldest tape, the systems and methods described herein can operate the library to provide for continuous tape back up. In this practice, data sent over the network to the library may employ a tape expiration technique wherein the tape holding or storing the oldest data is employed by the system for storing new data into the library. The controller to implement this process may be a software process operating on the back up server, that is capable of recording which tape in the library has been employed for storing data and at what time the data was stored. The controller may store data onto each tape until the tape is full, or incapable of taking new data. Once this occurs, the controller may determine if any tapes in the library are blank and available for storing data. If so the controller can select the blank tape for receiving data. Otherwise, the controller can compare the time information for each tape to identify the tape having the oldest data. That tape may then be selected by the controller for storing data. It is important to understand that although FIG. 1A depicts the system as having a single library, a plurality of tape libraries may also be employed. Accordingly, the expiration strategy can be employed across a plurality of tape libraries. Additionally, a plurality of different tape expiration strategies may be employed for a single tape storage library such as the tape storage library depicted in FIG. 1A. The tape expiration process may be employed with other types of long term storage systems, including hard disk systems, R/W CD-ROM, RAID systems, or any other suitable system.

Figure 2A:
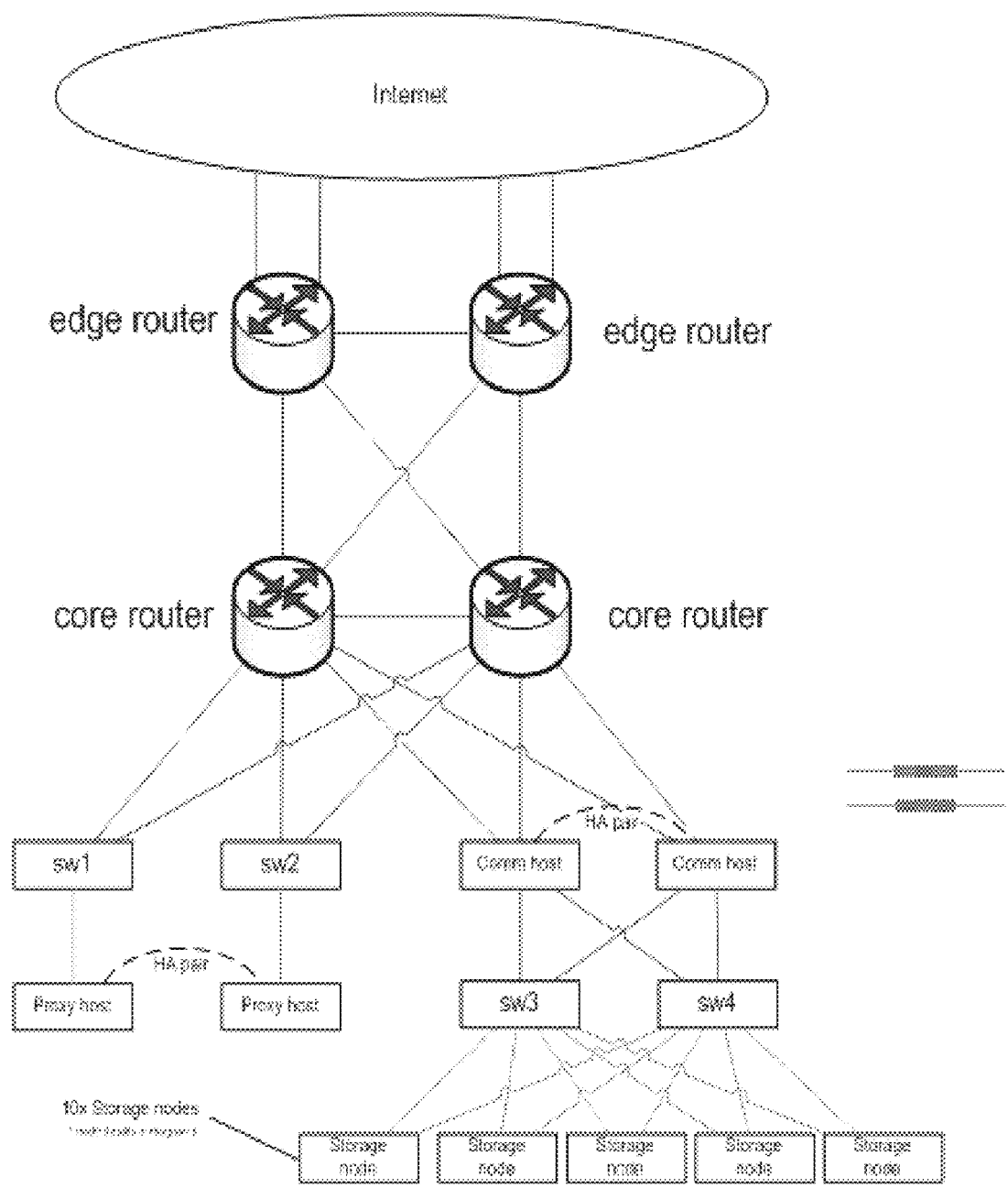
FIG. 2A-FIG. 2C show an exemplary data storage silo.
Figure 2B:
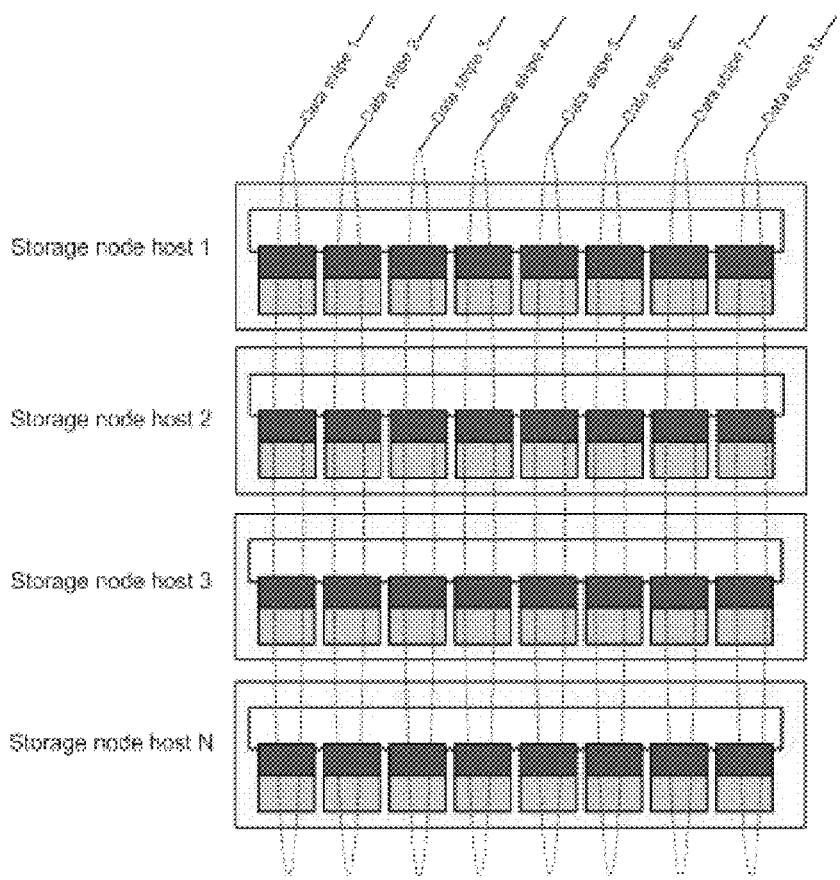
Figure 2C:
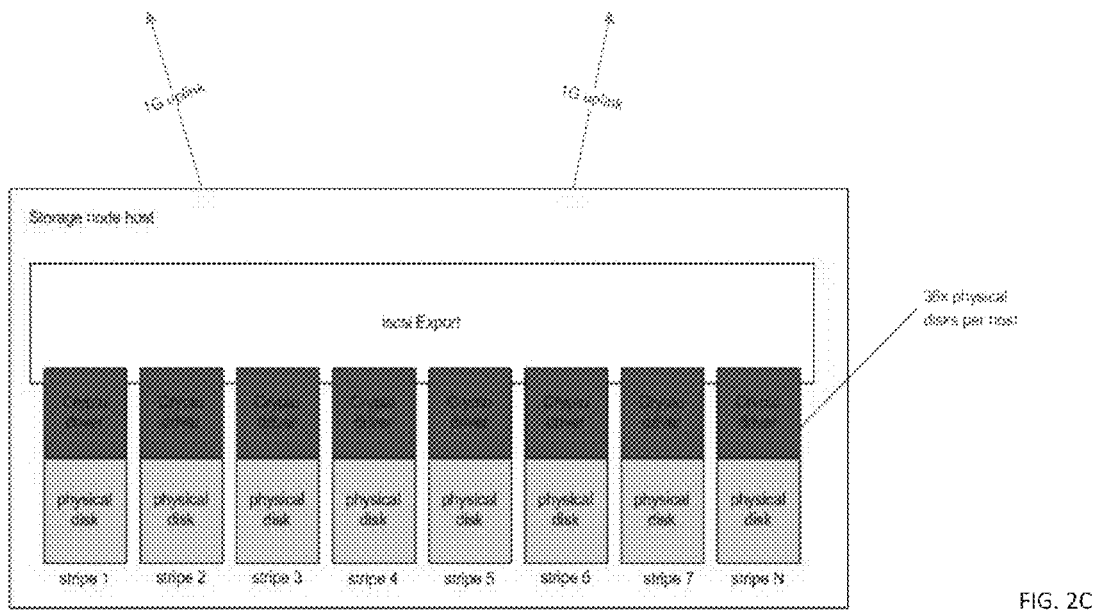

FIGS. 2A-2C show in more detail an exemplary storage silo 200 in the data storage array 32 or 138. Each storage silo is horizontally scalable to near infinite number of nodes. The system configuration and management system ties the nodes together in a shardable and easily scalable way to support potentially millions of volumes and organizations. The Authentication and networking infrastructure is based around industry standard mechanisms that have proven to scale to internet wide levels.

The silo 200 are comprised of 10 storage nodes and a HA pair of "heads," which own/control the file system, and the networking gear to support them. At the storage node level, it is a computer running Linux with a number of disks. Each disk is first run through a crypto driver module which provides for on-disk encryption. The cleartext end of that driver is then exported via iSCSI, across 2×1 gbps network interface cards. iSCSI is Internet SCSI (Small Computer System Interface), an Internet—

Protocol (IP)-based storage networking standard for linking data storage facilities. The iSCSI traffic is both load balanced and fails over the 1 gbps links, and connects to separate switches SW1 and SW2.

By carrying SCSI commands over IP networks, iSCSI is used to facilitate data transfers over intranets and to manage storage over long distances. The iSCSI protocol is among the key technologies expected to help bring about rapid development of the storage area network (SAN) market, by increasing the capabilities and performance of storage data transmission. Because of the ubiquity of IP networks, iSCSI can be used to transmit data over local area networks (LANs), wide area networks (WANs), or the Internet and can enable location-independent data storage and retrieval.

When an end user or application sends a request, the operating system generates the appropriate SCSI commands and data request, which then go through encapsulation and, if necessary, encryption procedures. A packet header is added before the resulting IP packets are transmitted over an Ethernet connection. When a packet is received, it is decrypted (if it was encrypted before transmission), and disassembled, separating the SCSI commands and request. The SCSI commands are sent on to the SCSI controller, and from there to the SCSI storage device. Because iSCSI is bi-directional, the protocol can also be used to return data in response to the original request.

iSCSI is one of two main approaches to storage data transmission over IP networks; the other method, Fibre Channel over IP (FCIP), translates Fibre Channel control codes and data into IP packets for transmission between geographically distant Fibre Channel SANs. FCIP (also known as Fibre Channel tunneling or storage tunneling) can only be used in conjunction with Fibre Channel technology; in comparison, iSCSI can run over existing Ethernet networks. A number of vendors, including Cisco, IBM, and Nishan have introduced iSCSI-based products (such as switches and routers).

The head nodes take in the iSCSI exports (which are whole disk mappings, rather than partial disk), and create raid stripes across the nodes. These raid stripes are aggregated into pools, from which volumes are created and thin-provisioned. A typical raid stripe is N+3, meaning 7 data disks and 3 parity disks. This layout has no single point of failure. If a switch fails, network traffic transparently fails over to the other link(s). If a given storage node fails, the volumes can continue for both read and write access. Writes that occurred when a given node was offline are tracked, and recreated when the storage node comes back online (rather than rebuilding the entire stripe/pool). If a given head fails, then the standby head imports all of the iSCSI targets, takes over the file system and virtual IP addresses, and resumes operation. One embodiment uses 360 disks which are partitioned into pools of 120 disks each, and the pools are used for inter-customer load balancing and isolation.

The system has built a fully automated provisioning system that allows for new customer signup and service delivery with no human interaction. This allows for complete automation of the customer acquisition process, partner provisioning of new customers and the ability for customers to add additional separate storage volumes directly through our web based configuration platform. The customer is able to choose the desired location of the new volume from a geographic list of system data centers. This system allows increased operational efficiency and rapid growth. The storage volumes are provisioned from multiple sets of available physical storage that are expanded just ahead of demand based on growth projections.

Figure 3:
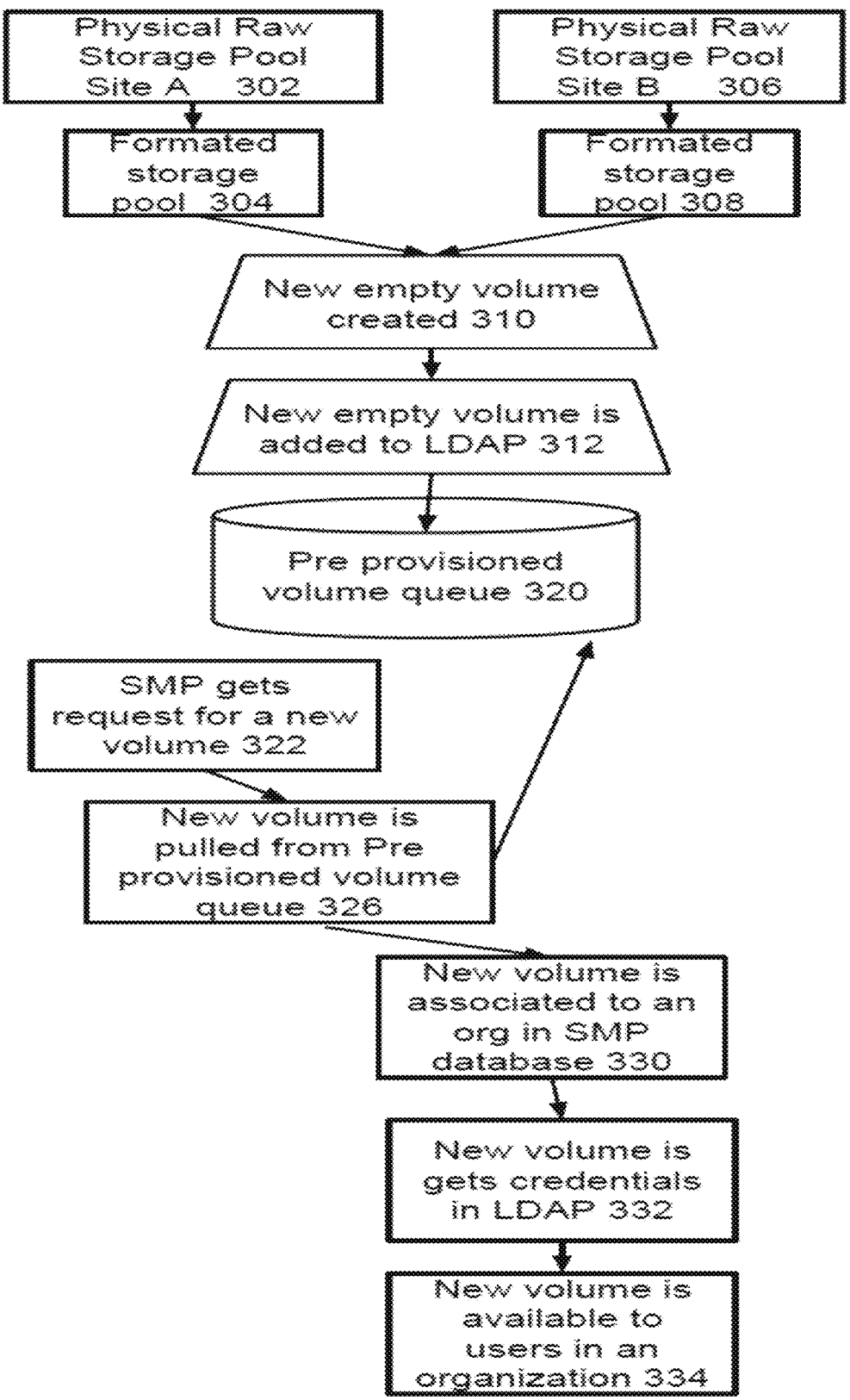
FIG. 3 shows an exemplary process to perform automatic provisioning of new customers or trial volumes.

FIG. 3 shows an exemplary process to perform automatic provisioning of new customers or trial volumes, including administrative account setup, storage provisioning, and enabling of billing and monitoring is all done with no human in the loop.

The data protect solution is a combination of several systems including the Mirror Client, the System Management Portal (SMP), and the Storage System. In order for a new customer to use the service or for an existing customer to add additional storage volumes a volume must be created out of a previously existing shared storage pool. The system allows for volumes to be made available in an automated way.

In FIG. 3, the system has a plurality of data storage facilities or sites A and B. Geographically Diverse Data Centers are used. Two first-class shared-nothing facilities provides for a geo-replication option. With geo-replication, the customer receives two volumes, one primary (read/write) and one secondary (read only). Read access to the secondary is available continuously. Replication is based on snapshots which fire on a timer, typical propagation delay is about 4 hours.

For site A, a physical raw storage pool is allocated (302) and the storage pool is formatted (304). Similarly, for site B, a physical raw storage pool is allocated (306) and the storage pool is formatted (308). A new empty volume is created (310), and the new empty volume is added to LDAP (312). The pre-provisioned volume queue is set up (320).

During operation, the SMP 120 gets a new request for a new volume (322), and the new volume is pulled from the pre-provisioned volume queue (326). The new volume is associated with an organization in the SMP database (320). The new volume is given credentials in the LDAP (332) and the new volume is made available to users in the organization (334).

In one implementation, physical storage is aggregated via RAID and RAIN methods and made available as a large unpartitioned storage pool. The unpartitioned storage pool allows for the creation of individual volumes. Individual volumes are created from the unpartitioned storage pool using a set of scripts. A Globally Unique ID (GUID) is created and is associated to the new volume. The volume GUID and the network location of the volume is loaded into a queue that holds empty volumes. The queue is implemented in a Database and is queryable. This is called the "pre-provisioned volume queue". The queue also records the physical location of the new volume such as "New Jersey Data Center" or "Santa Clara Data Center."

The newly created volume gets a new entry in an LDAP database that associates it to a known organization. The LDAP entry allows for authentication to the volume for authorized users in an organization. At this point the volume is not assigned to an organization, but it does get credentialed enough so that a monitoring system can log in and test the volume. This is a key part of the process since we need to monitor all volumes even if they are not yet provisioned to an organization. The SMP manages the process of supplying a volume to a specific user or organization.

When a new organization is added or an existing organization requests an additional volume, a pre-provisioned volume is taken out of the "pre-provisioned volume queue" and assigned to the organization ("org"):

a New volume is requested due to "new org" or "existing org requests another volume" The organization usually requests a volume in a specific physical location such as "Santa Clara Data Center"

b SMP pops a volume from the "pre-provisioned volume queue" that matches the correct physical location.

c SMP associates the volume GUID to an organization within its own database d SMP changes the LDAP entry for the volume to allow users from the organization access to the volume via credentials managed via the SMP.

Next, the client software 10 is detailed. The client software 10 is designed to be very thin with minimal local UI and configuration. Once the client has been authenticated and connected over the internet to the System Management Portal, (SMP), almost all configurations and control are done through the SMP 20. The local client 10 does have some UI for real time monitoring and does duplicate some of the SMP functionality, such as "start next job". Not all versions of the client have UI. Windows software currently has the most UI while Linux and Mac versions are almost complete headless with a simple command line interface for control after installation.

Figure 4:
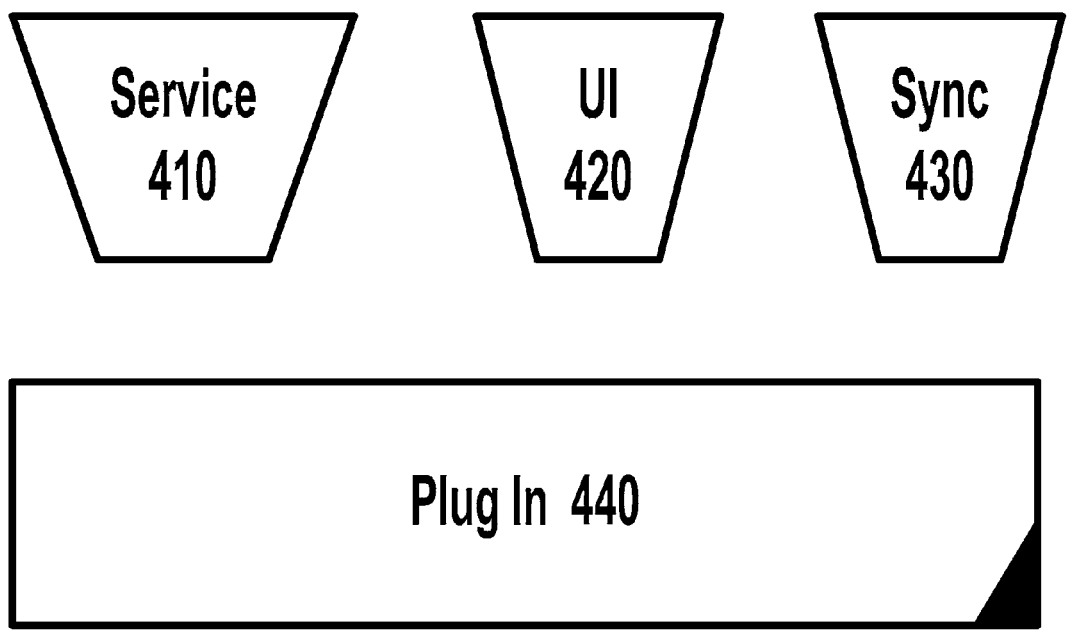
FIG. 4 shows a block diagram of an exemplary client software with separate processes that work in concert with each other and a plugins module.

As shown in FIG. 4, the client has three separate processes that work in concert with each other and a plugins module as follows:

Service component 410—The scheduler and watchdog process, also communicates with the SMP User interface component 420—Presents a UI to the user and is optionally run or not run Sync component 430—Runs only during a sync window; Finds files that have changed and handles data transfer; and Returns statistics and errors to the service process via a pipe.

Plugin component 440—A loose collection of programs invoked by the Service to handle special functions necessary for the sync/backup process One embodiment of the Service component 410 is implemented as a Service on Windows and as a long running process on Linux and Macintosh. The Service stays in constant contact with the Zetta SMP and can respond to requests and commands from SMP in real time. When a sync is scheduled the SMP instructs the Service 410 to start a sync at a specified time. At the requested time the Service 410 starts a Sync process and monitors a shared pipe to communicate status and errors back to the SMP. The Sync component 430 can also detect process deadlocks, stalled syncs or other errors and can proactively cancel the sync process when necessary. The Service component 410 is also responsible for invoking virtual storage snapshots prior to a sync and for launching plugins before, after, or in place of a normal file sync.

One embodiment of the UI component 420 provides a user interface for local users of the host computer. The UI can communicate to the service 410 via a shared pipe and can send commands to the service and monitor progress. Typically the UI component 420 is represented as a small icon in the notification area and can be expanded to a larger view that shows real time and historical sync progress. A context menu provides a list of commands that can be sent to the Service 410 as well as a list of views that can be opened to show further information.

Turning now to the Plugin component 440, complex backup functions can be encoded within a plugin rather than embedded in one of the existing client processes. Examples of this are: specific database serializers and customer written pre and post backup procedures.

The Sync component 420 contains most of the complexity of the client 10. One embodiment of the Sync component 420 performs the following functions:

File change detection
Sub-file difference detection
Breaking large files to manageable chunks
Compression
Transmission
Parallelization
Bandwidth and CPU utilization throttling Next, certain sync process operations are detailed.

File change detection. The sync process iterates over all the files of a specified file tree to determine which files it needs to replicate. To determine which files are already on the remote file tree the client can either ask the remote server for a listing, or it can use a cached copy of the same information from a previous sync session. One embodiment uses a cached copy called "manifest". A manifest is an ordered list of files that include relevant meta data and current backup status. By traversing the file tree is a specific order the manifest is used as a very efficient database to detect which files need to be transferred and which files are unchanged since the last transfer.

Work queues and parallelization. When a file or directory has been flagged for transfer by the "file change detection" step, it is placed in an appropriate work queue. The work queues are accessible to a configurable number of parallel threads that can take work off the queue and handle each file or directory. The work queues and the work processes create a system where multiple files and directories can be analyzed and transferred simultaneously. This allows for better CPU, I/O and network efficiency. One embodiment implements the work queues using ordered data structures like heaps or trees so files and directories can be efficiently processed in output manifest order with lower memory utilization. Memory footprint is also limited by flow control which stops input manifest read and copy traversal until the number of in core objects drops below some threshold except when needed to avoid deadlock. In one exemplary scheduling data structure, the system uses priority queues which implemented as heaps as opposed to queues which are generally done as linked lists. In other embodiments, the system can use balanced trees like red-black trees to achieve better insert and remove performance where both tend to be in collating order (O(n) vs. O(n log n).

Sub-file difference detection. If a file has been previously transferred to the remote server and flagged as changed in a subsequent run, the client 10 can perform a sub-file difference detection algorithm to determine which parts have changed. Changed parts are determined using a block signature algorithm and a block signature file that is saved by the client during each upload. The net result of the difference detection is a list of blocks that have changed and a list of places where the blocks should be inserted in the remote file to make the two files identical.

Compression. The sync process can optionally compress using the gzip algorithm and container format any data that it transfers. The container format includes a checksum that validates the data integrity end to end.

Transmission. The sync process uses the Webdav API over HTTP and SSL to transfer data in a WAN efficient way. One embodiment uses a Webdav API that has been extended and modified to allow for sub-file patching in one operation, upload compression and individual sub-file patching.

Resource utilization throttling. The sync process can be configured to limit network bandwidth, disc bandwidth, random disk operation rate, and CPU usage. A rolling average is kept to determine utilization and a damping algorithm is used to inject pauses that bring the rolling average below the utilization threshold. One embodiment keeps a second rolling average over a shorter time window to allow brief shorter bursts to achieve a target resource usage rates in spite of short stalls.

In one embodiment, two rolling averages are used over long and short time periods, which allows a higher burst rate during the short period so that the system can work around latency. One embodiment uses a pair of parallel token buckets: one limiting transmission time at the burst rate which fills at the target rate, one placing an upper limit on initial sends which fills at the burst rate. Token buckets are used for rate limiting with tolerance for burstiness. A metaphorical bucket of tokens is used with a constant fill rate, with overflow tokens being discarded once the bucket is full and operations removing a number of tokens equal to their cost before starting.

In one implementation, the client side program or client software 10 encapsulates meta-data in a separate file from data for full and incremental backups that allows resource efficient detection of changes to limit data for a current backup, can execute I/O in parallel, supports meta-data for arbitrary operating systems, and can be efficiently transferred and used separately from the data for other purposes such as asynchronous back-up validation.

Figure 5:
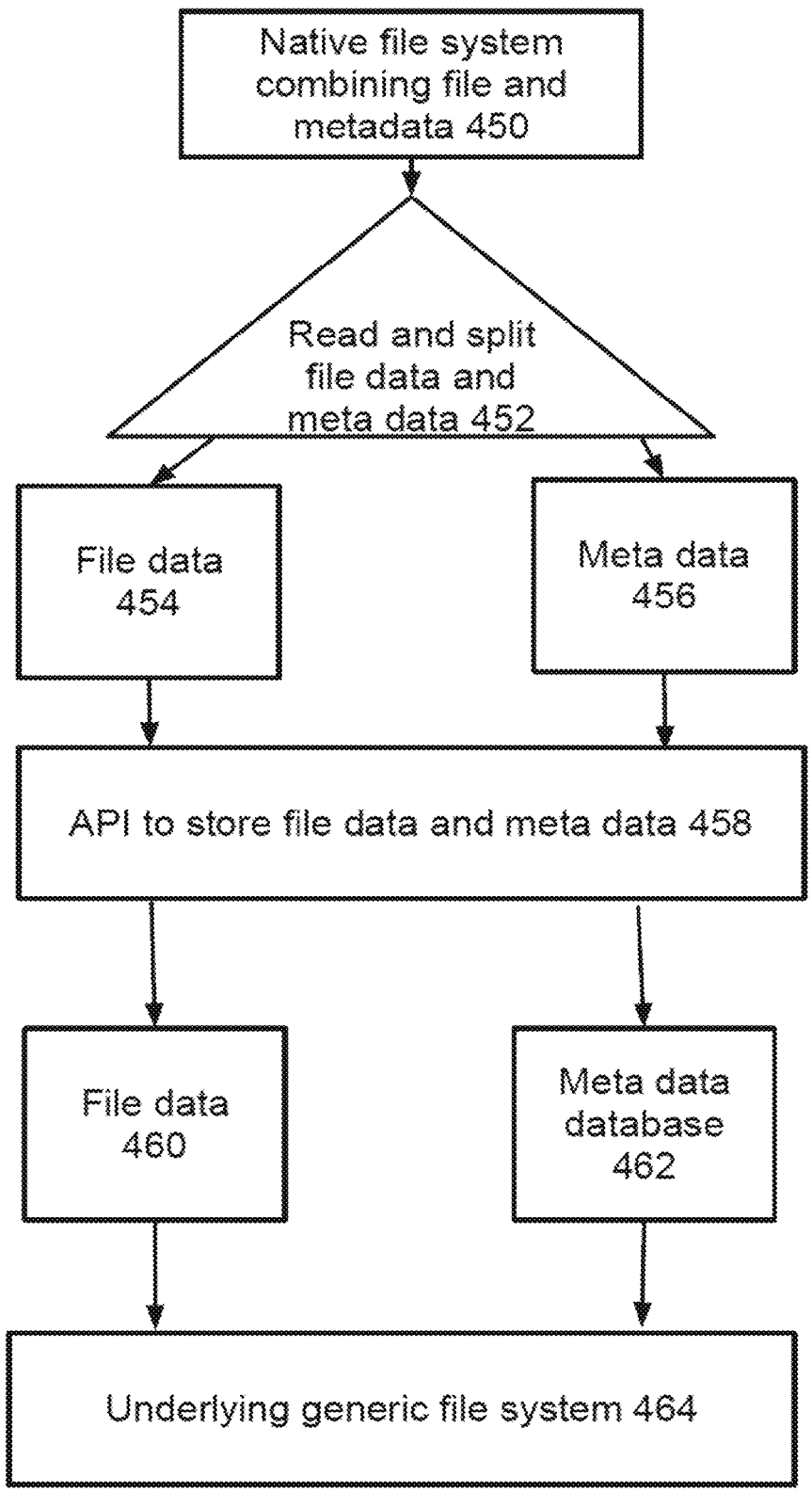
FIG. 5 shows an exemplary back end distributed metadata store process performed by the client software 10 in one embodiment.

FIG. 5 shows an exemplary back end distributed metadata store process performed by the client software 10 in one embodiment. The process can store any type of metadata, even data unsupported by the system's underlying back end file system, in sidecar files for any type of attribute. Applications include extended ACL's, long file names, document tags or classifications, among others.

File systems come in many flavors and hold differing types of meta data. Native file systems typically are accessed with API's that give programmatic access to meta data. Native meta data is stored within the file system in ways that are very specific to the particular file system. In order to support diverse file systems, the system stores arbitrary meta data that could be mapped to any file system. This is done by:

- Separate the meta data from the file data
- Store the meta data beside each file in a separate file
- The meta data file is itself a database capable of storing any kind and any amount of meta data.
- The meta data database is space efficient as well as efficient for random access item lookup
- Overlay an access mechanism such that, for every file, the meta data can be queried, set, or overridden.

Turning now to FIG. 5, the user's computer has a native file system that combines file and metadata (450). The process splits the file data from the metadata (452) into constituent file data 454 and metadata 456. Through an application program interface (API), the process stores file data and metadata (458). During a restore operation, the API can be used to take separate file data 460 and meta data database 462 to restore the generic file system 464 as needed.

In one implementation, a simple database format is used with a very low overhead. It is a single index DB that can encode arbitrarily sized elements. Most databases typically contain fewer than a dozen entries and less than 4K of data. Since a single file usually takes up a single block, the system keeps the meta data database file size below the size of a single block. For each file in the system a metadata database is created as a shadow of that file in a hidden folder. Notably different from other systems that use a single metadata store (i.e., a relational database) that becomes a scalability problem/single point of failure. Using this method, the system can scale arbitrarily large datasets, and have wide client platform support.

In one embodiment, the causal consistency and optimistic locking in the MDBM format metadata database is used to leverage efficient access to the WebDAV locks data base and for sha1 hashes stored there with asynchronous updates. For example, a file hash in the database is invalid for version 1 of the file, a background process or thread begins recalculating the hash, the file is changed resulting in an invalid hash for version 2 of the file, and the database refuses a write from the hash calculation process because the calculate hash was based on having version 1 of the file which is no longer the case.

One embodiment uses a WebDav API that already provides syntax for reading and writing arbitrary meta data. Methods are implemented to use the WebDav API to interface with the database files, and have mapped process of FIG. 5 to the existing API. Web Distributed Authoring and Versioning (WebDAV) is an extension of the Hypertext Transfer Protocol (HTTP) that facilitates collaboration between users in editing and managing documents and files stored on World Wide Web servers. A working group of the Internet Engineering Task Force (IETF) defines WebDAV in RFC 4918.

The WebDAV protocol makes the Web a readable and writable medium.[1] It provides a framework for users to create, change and move documents on a server; typically a web server or web share. The most important features of the WebDAV protocol include the maintenance of properties about an author or modification date, namespace management, collections, and overwrite protection. Maintenance of properties includes such things as the creation, removal, and querying of file information. Namespace management deals with the ability to copy and move web pages within a server's namespace. Collections deals with the creation, removal, and listing of various resources. Lastly, overwrite protection handles aspects related to locking of files.

In one embodiment, the client software 10 acts as a translation agent between the original native file system and the system's split file and metadata system. For each file the client software reads the file data and the meta data and sends both components via a WebDav API. The servers store the file data and meta data separately on a file system, but they are linked via folder proximity and file name.

Since there is no common database the system can scale up to billions of files. Finding the meta data for a given file is simple since the file data and the meta data are stored in proximity of each other.

Examples of File meta data include:
File modification time
File creation time
File access time
File size
Windows ACLs
UNIX permissions
SHA1 Hash of the file data Although WebDAV is used in one embodiment, other protocols can be used. For example, the File Transfer Protocol (FTP) is a simple network protocol based on IP, which allows users to transfer files between network hosts. FTPS is an extension for secure traffic. Other protocols include the SSH File Transfer Protocol (SFTP) which is an extension of the Secure Shell protocol (SSH) version 2.0 to provide secure file transfer capability. A distributed file system such as the Server Message Block (SMB) protocol allows Microsoft Windows and open-source Samba clients to access and manage files and folders remotely on a suitable file server. AtomPub is an HTTP-based protocol for creating and updating web resources, which can be used for some of the use cases of WebDAV. It is based on standard HTTP verbs with standardized collection resources that behave somewhat like the WebDAV model of directories. CMIS is a standard consisting of a set of Web services for sharing information among disparate content repositories that seeks to ensure interoperability for people and applications using multiple content repositories; it has both SOAP and AtomPub based interfaces.

The client software application 10 iterates over a data master copy (which may be a primary copy or snapshot) and 1) input manifest file describing slave copy from a previous execution and/or 2) data slave copy. Different tasks in this iteration may be asynchronous. The application determines differences between the data copies with the option to source meta-data and signatures from the manifest file at significantly lower input/output cost than accessing the slave copy directly. Differences may be applied to the slave copy directly, indirectly through an intermediate file format, or the processes may validate without making the copies match. The master copy may be that being backed up or a copy of a previous backup for validation. Both master and slave copies may be local or remote to the computer executing the backup software, with protocols such as WebDAV or CIFS used to access data. An output manifest describing slave contents may be generated for subsequent backup executions or other activities such as providing a summary of storage utilization.

Next, an exemplary manifest file and format are discussed. The manifest file describes the contents of a full or partial copy and may include meta-data which is being transferred as part of a backup. This meta-data encapsulation separate from data facilitates data transfer where the desired intermediate format (example—ISO 9660 for optical media or FAT32 for other block storage) lacks support for that meta-data (like Windows NTFS access control lists) or the infrastructure writing the slave copy has incomplete support for the chosen non-native file system used to affect the transfer. The manifest entries may also associate intermediate files with alternate data streams or file forks on the master and/or slave copy where the intermediate format does not support such associations.

The manifest file describing contents is written in a collation order with one implementation arranging file system object entries alphabetically with ancestors following descendants. For instance, a directory tree may produce a manifest file containing entries ad/1d, ad/2d, ad/2d/wf, ad/2d/xf, ad/2d, ad/3f, ad where a directory, directory tree, or directory sub-tree is processed in the same collation order (which facilitates detecting differences without having information for every entry in the data subset in memory) this allows sequential I/O where the seek cost on rotating media is amortized over a relatively large amount of data and the total I/O cost to read or write a manifest file is negligible compared to other operations which are necessary in the backup or validation process.

One implementation has header identifying information such as a manifest format version allowing backwards compatibility when changes are made. The header may be stored in the same format as per-file entries. The header may have additional information about the source or destination. Such information may include file system attributes restored on recovery such as the number of inodes. It may describe other data and manifest combinations which are other parts of a complete data set. The header may include other arbitrary key/value pairs.

One implementation has a trailer. The trailer may be stored in the same format as the data record. The trailer may include a mechanism to validate that the entire file such as a hash. The trailer may include other arbitrary key/value pairs.

One implementation treats manifest entries as a set of arbitrary key/value pairs with one key treated as primary with its contents used to determine order. Manifest entries may include internal or envelope fields used to validate record and/or file integrity up to that point such as hashes.

One implementation uses a text format which can be accessed with a minimum implementation cost where the computer operating on it is different in terms of operating system and/or processor where things like bit-width and word ordering may vary. Such a format also allows more rapid and less expensive tool implementation in languages other than that used to create the manifest file. Escaping may be used so that the data fields can contain key/value, field, and/or record separators. This facilitates backup validation on a machine (such as a server in a private cloud running a UNIX-like operating system) significantly different from the one which wrote the backup (such as a Windows desktop machine).

Hashes protecting record and file content key/value pairs may be calculated as if their fixed size value were replaced with a different character sequence such as the same number of '0' characters.

One implementation of the manifest format is as follows:
The manifest starts with a header defining the version
(=header,_internal_type=header,_internal_version= 1,_internal_record_crc=917e1394)
Each line in the manifest thereafter is a file or directory entry. Each subentry in a line is separated by a comma
The first item is the file name preceeded by an equal sign (=)
The next subitem and all subsequent subitems are name value pairs. Common name value pairs are:
acl_list: windows ACLS
hash: SHA1 hash of the file data
st_ctime: creation date
st_mtime: modification date
type: file,directory,link
st_size: file size
st_nlink: the number of links to the underlying inode
st_ino: inode number
_internal_record_crc is the last sub item in a line and is used to verify the correctness of a given record.
The last line of the manifest provides a hash to validate the whole manifest file.

```
=trailer,_internal_file_sha1_hash=9aabaa435425514a1f97b70c36013426bbbe2b50,_internal_ty
pe=trailer,_internal_record_crc=64a0a85f
```

One full file example of a manifest is as follows:

```
=header,_internal_type=header,_internal_version=1,_internal_record_crc=917e1394)
=1998 Pie Guys Band/1998 Pie Guys Band 2009.mov,acl_list=O:S-1-5-21-761903142-759465075-
2234511197-1000G:S-1-5-21-761903142-759465075-2234511197-
513D:(A;;FA;;;BA)(A;;FA;;;SY)(A;;FA;;;S-1-5-21-761903142-759465075-2234511197--
1000)(A;;0x1200a9;;;BU),attrs=32&,hash=23cb78a5f5bf473a98d2b69567af85d3934bde3f,s
t_ctime=1335308694,st_ino=24182,st_mode=100000,st_mtime=1232316311,st_nlink=2,st_size=105,typ
e=file,version=1,_internal_record_crc=eb9de567
=1998 Pie Guys Band/1998 Pie Guys Band.avi,acl_list=O:S-1-5-21-761903142-759465075-
2234511197-1000G:S-1-5-21-761903142-759465075-2234511197-
513D:(A;;FA;;;BA)(A;;FA;;;SY)(A;;FA;;;S-1-5-21-761903142-759465075-2234511197-1000)
=trailer,_internal_file_sha1_hash=9aabaa435425514a1f97b70c36013426bbbe2b50,_internal_ty
pe=trailer,_internal_record_crc=64a0a85f
```

Another exemplary manifest file is illustrated below:

```
=header,_internal_type=header,_internal_version=1,_internal_record_crc=917e1394
=ad/1d,st_gid=0,st_nlink=0,st_uid=0,type=directory,_internal_record_crc=2a7af3b3
=ad/2d/wf,hash=52d7173aca089119fa309bb0fdf290388579b820,st_atime=1352141874,st_gid=
100,st_ino=2697433,st_mode=100644,st_mtime=1352141874,st_size=43,st_uid=1012,type=file,_interna
l_record_crc=373e829e
=ad/2d/xf,hash=0f80ae7be0ae09addd00ac58e58b9754c8e97553,st_atime=1352141874,st_gid=
100,st_ino=2697434,st_mode=100644,st_mtime=1352141874,st_size=43,st_uid=1012,type=file,_interna
l_record_crc=ecd8d7de
=ad/2d,st_gid=0,st_nlink=0,st_uid=0,type=directory,_internal_record_crc=63cc26b0
=ad/3f,hash=b71334e77eab6885df4fea046bde3316b9cd80a9,st_atime=1352141874,st_gid=100
,st_ino=2697435,st_mode=100644,st_mtime=1352141874,st_size=40,st_uid=1012,type=file,_internal_r
ecord_crc=ebbb647e
=ad,st_gid=0,st_nlink=0,st_uid=0,type=directory,_internal_record_crc=510b8160
=,st_atime=1352141874,st_gid=100,st_ino=2697429,st_mode=40755,st_mtime=1352141874,st
_nlink=2,st_size=4096,st_uid=1012,type=directory,_internal_record_crc=d667c7e4
=trailer,_internal_file_sha1_hash=dcae1054559b6ac377dff739a7b2c0fe12e918a0,_internal_typ
e=trailer,_internal_record_crc=ed3aa5ed
```

Figure 6:
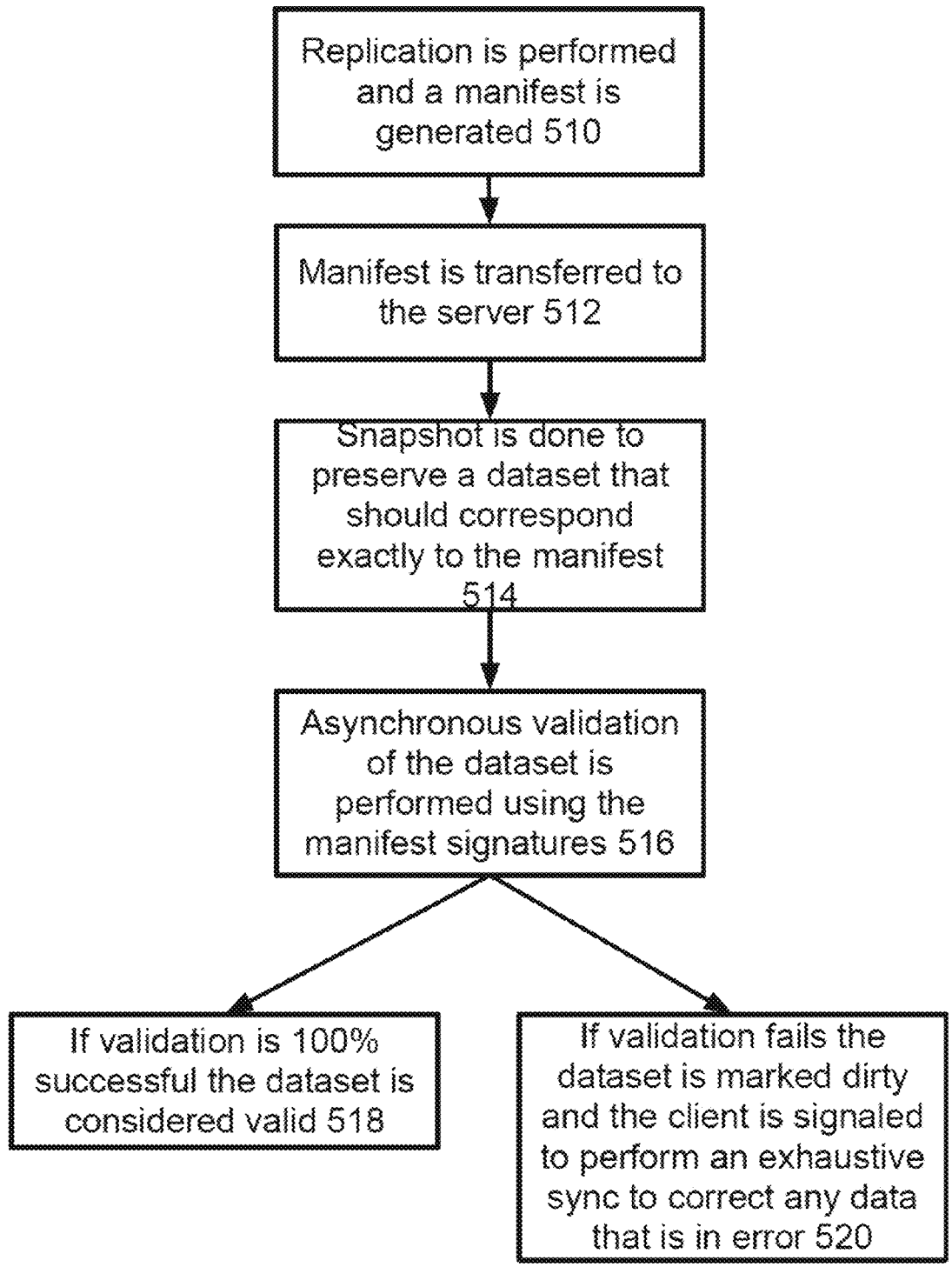
FIG. 6 shows an exemplary process for performing Asynchronous Replication Correctness Validation.

One exemplary backup process using manifest files is detailed next. FIG. 6 shows an exemplary process for performing Asynchronous Replication Correctness Validation. A replication is performed and a manifest is generated (510). The manifest is transferred to the server (512). A snapshot is done to— preserve a data set that should correspond exactly to the manifest (514). An asynchronous validation of the data set is performed using the manifest signatures (516). If the validation In one implementation:
A manifest of the client data set is generated during the initial and subsequent sync process, within the manifest is a SHA1 signature of each file as well as a list of critical meta data such as "last modified time" and "file size"
After the sync is done the manifest is transferred to the server and stored
A snapshot is done on the server dataset to create a time frozen data set and is performed at the end of a sync at the behest of the software client 10 or on a regularly scheduled snapshot schedule.
Asynchronously, the manifest is compared to the time frozen data set on an item by item basis.
For each file the SHA1 signature is regenerated from the server file and compared to the signature from the client. The critical meta data is also compared.
If any file fails the signature or meta data test it is flagged in such a way that the client will resynchronize the file at the next available synchronization window.
All failures are also logged for analysis by the engineering and QA teams.

The system can generate a manifest file with the actual contents of the server which the client can access and synchronize against. Using the uploaded manifest file, all metadata (and optionally on-disk payload via hash compare) is verified and compared with the on-disk state. If a discrepancy is found, the manifest is wiped or patched and pushed down, and the next sync job resolves all discrepancies. This second check is a way of performing complete end to end validation, like a restore test, without having to do an actual restore.

The client server based replication creates a copy of data from the client system to the servers. The copy is a representation of the data that should be an exact copy of the client system data. Replication has many steps that could potentially introduce discrepancies between the client and server data sets. The above process validates the correctness of the replicated copy without introducing additional load on the client computer and allows for flexibility in the time that the process was performed.

One implementation has up to one thread reading an existing manifest file sequentially, up to one thread writing a new manifest file sequentially, and a configurable number performing asynchronous I/O on master and/or slave copies and computations necessary for the back-up processes such as hash generation to detect subsequent data changes and allow backup validation. The threads may have roles which change through program execution—for instance, a single thread may alternately read the input manifest, access the master copy, access a slave copy, and write the output manifest. —

The sequential I/O processing the manifest file has a negligible impact on the time and resources needed to complete a backup on the customer system.

File system object differences may be determined and acted upon directly from comparing master and slave metadata. Differences may be determined with one indirection step from comparing the current master copy to its description in the current slave manifest file thus reducing I/O on the slave copy which allows a smaller ratio of servers and disk drives to customers where the hardware handling the slave copy is owned and/or operated by a party other than that making the backup. This mechanism of determining differences results in fewer superfluous transfers than simply looking at object modification times which may advance for both data and meta-data (like permission changes) updates. It supports multiple slave copies processed separately which is less practical with an archive bit. Differences may be determined through two steps of indirection, for example with a file hash mismatch between master copy and current slave manifest leading to a comparison of file segments to per-segment hashes or checksums. This double indirection allows a minimal set of changes to be transferred to the slave copy without the I/O cost of examining the finer grained signature data when not required.

Another implementation tries to process file system objects in the collation order, with out-of order processing allowed when directory reads complete on later collating directories before earlier.

Flow control may be applied so that meta-data retrieval from an input manifest file and master and the slave copy meta-data traversal ceases when the amount of meta-data in-core reaches some threshold so that memory is not exhausted and the computer does not need to page or swap to disk which can reduce performance by orders of magnitude. Exceptions are applied to the flow control scheme can be applied to prevent deadlock; for instance directory reads will always be performed on master copy directories where their entries will be next in the manifest file.

Where an individual directory contains numerous entries, its meta-data for that copy may be retrieved in manageable increments, sorted, and written to a manifest file. The contents of those files may be ingested as needed subject to the flow control rules, with merge sorts performed as they are read and/or as a separate process where the resulting number of open files would be undesirable.

Where the backup process is terminated before completion due to scheduled or unscheduled reasons the new manifest file may be combined with the old manifest file and the process resumed where it left off by a new backup program execution. Scheduled reasons include but are not limited to operating system upgrades and to reduce load on a system during business hours when its resources are needed for other purposes. Unscheduled reasons include backup program termination due to insufficient resources like memory or a program error.

This combination may be performed with a merge sort. The merge sort may be performed before the backup process resumes with the old manifest file describing slave contents as they were before the backup combined with the incomplete manifest file from the incomplete backup to produce a third manifest file which is then used for input. While merging manifest files the backup program may note the last entry in the new manifest file and elect not to perform expensive operations on file system objects which collate before that so that the backup completes sooner in the time available. The merge sort may be performed on manifest read with old and new manifest files combined as they are read. In that case the skip logic can be performed with a search for the last entry beginning at the end of the new file.

When synchronizing a slave copy, one implementation updates the slave when differences are detected where the slave may be on a directly attached file system, network file system like CIFS or NFS, or WAN target via a protocol such as WebDAV.

When synchronizing another implementation generates one or more manifests describing the contents of one or mass storage units which can then be physically moved to where slave copy exists and used in conjunction with the manifest file(s) to populate it. This is useful for ingesting new data and restoring customer data following a storage failure where shipping media provides higher bandwidth than the master copy to slave network connection.

The same backup program and process may be used for restoration, where what was the slave on the backup is the master is used for restoration.

The same backup program and process may be used to asynchronously validate that the slave copy matches what the program on the master believes it to be with this process executing at a time outside the backup windows where load on the slave copy processors and storage is lower.

Figure 7:
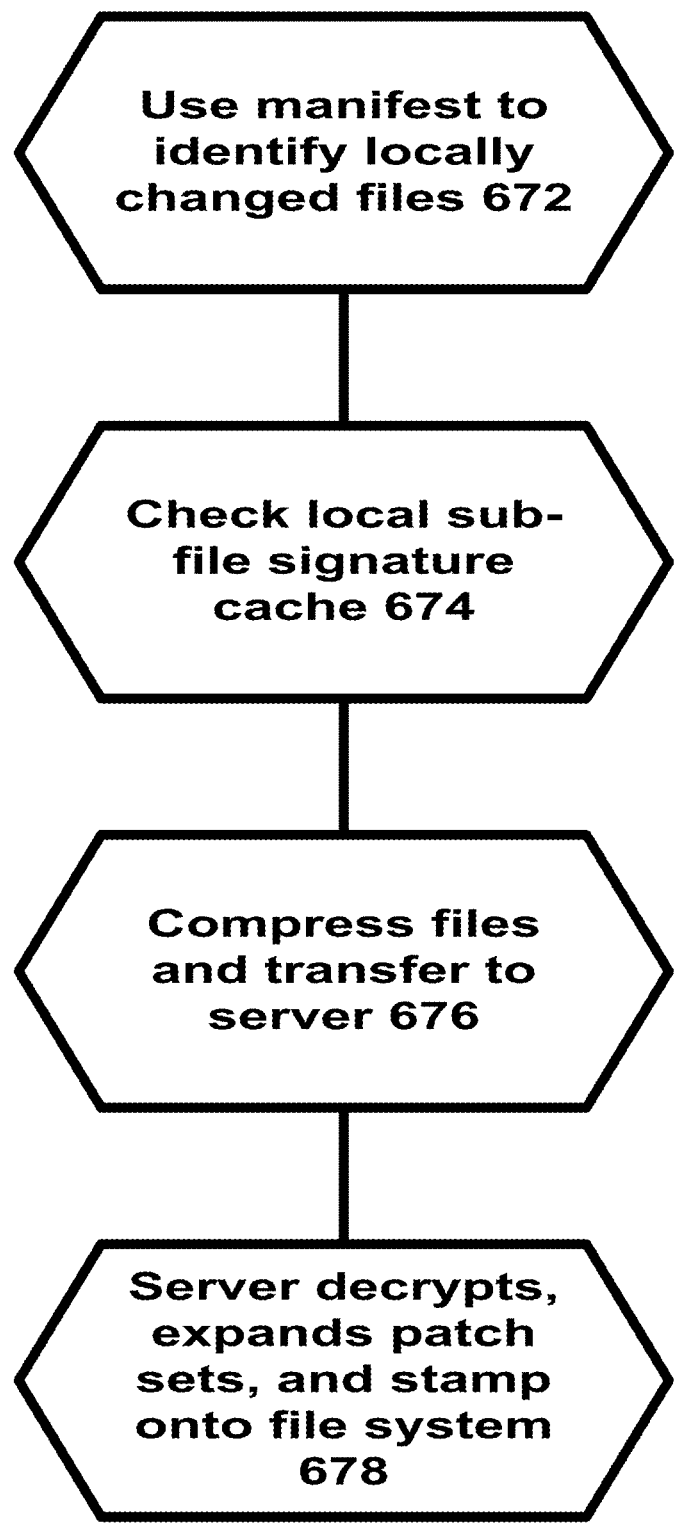
FIG. 7 shows an exemplary process to efficient replication of client machine content.

FIG. 7 shows an exemplary process to efficient replication of client machine content. As network bandwidth is generally the key limiting resource for an Internet delivered backup or replication service, one embodiment of the client software 10 goes through a number of steps to ensure that the minimum amount of data needs to be transmitted.

First, the manifest is used (672) to identify locally what files have changed. This is done by traversing all the files in a subdirectory and comparing the cached status of the corresponding file on the server end. If the file is the same it is ignored. If the file in new, it is marked for upload and if it has changed, it is passed to the sub-file change detector.

Next, a local sub-file signature cache is consulted to detect insertions, removals, and rearrangements of data in files, so that only the changed portion of the file is transmitted (674). Changes are wrapped into a container and marked for transmission All uploads that are compressible, as determined by their file types, are compressed with standard compression libraries, the payload is encrypted with SSL, and the payloads are transferred to back up server (676). In one embodiment, this is done in 10 MB chunks over WebDAV, which is an API that uses HTTP and is designed for moving large amounts of data over WAN connections. Additionally, multiple threads are run in parallel, overcoming slowness or limitations in TCP window scaling adjustments, or handling network "long fat," (high latency high bandwidth) network connections.

At the receiving end the WebDAV server intelligently decrypts, expands the patch sets, and stamps them down onto the file system (678). This results in the transfer efficiency of an incremental backup, but generates a full backup with snapshots going back in time for version history. Notably, this also results in a mountable/usable file system, as opposed to a backup "blob," that requires processing by the backup software before it is transformed back into a usable state.

Details on one implementation with the WebDav interface extensions:

Compression is performed using the HTTP Content-Transfer-Encoding: gzip methodology. This allows objects transferred via HTTP to be compressed with the gzip library during transfer. This is something that is technically allowed in the HTTP specification, but to our knowledge has never been implemented for WebDAV uploads. (or possibly any uploads via HTTP).

Subfile patching is performed using a new HTTP verb that we implemented called PATCH-APPLY. Details are below.

COMMAND=PATCH-APPLY

Headers content-range=bytes:range_start-range_end/total_file_size, Required

This header is used to indicate the portion of the file that is being modified, by this command.

range_start and range_end are inclusive offsets.

Eg. content-range=bytes:0-1023/2097152 specifies a chunk from the beginning of the file, of size 1K, for a file of 2 MB content-length=size_of_delta_contents, Optional Eg.content-length=11, specifies delta content payload of 11 bytes, which usually indicates a delta command meaning no change.

FileTruncate=true, Optional

Setting this flag, will cause the file to be truncated to the byte specified by range_end, in the content-range header.

Setting the value to be anything else, will indicate FileTruncate=false.

PAYLOAD=delta content

Response:

Success-http response code 204

Indicates the file on the server has been updated.

Failure-http response code 500,400

Any error on the server when processing the command, returns this error code.

Known error cases:

content-range header is missing, bad content-length, error when reading data-400 (HTTP_BAD_REQUEST)

file does not exist-500(HTTP_INTERNAL_SERVER_ERROR)

file offset does not exist-500(HTTP_INTERNAL_SERVER_ERROR)

file io error, eg. unable to read or write to disk-500(HTTP_INTERNAL_SERVER_ERROR)

The subfile delta content payload is a package that contains all of the delta data with file offsets for where the data is to be inserted within the file. The payload is generated via the Rsync library. (an open source subfile detection library)

As network bandwidth is generally the key limiting resource for an Internet delivered backup or replication service, the client software 10 goes through a number of steps to ensure that the minimum amount of data needs to be transmitted.

Figure 8:
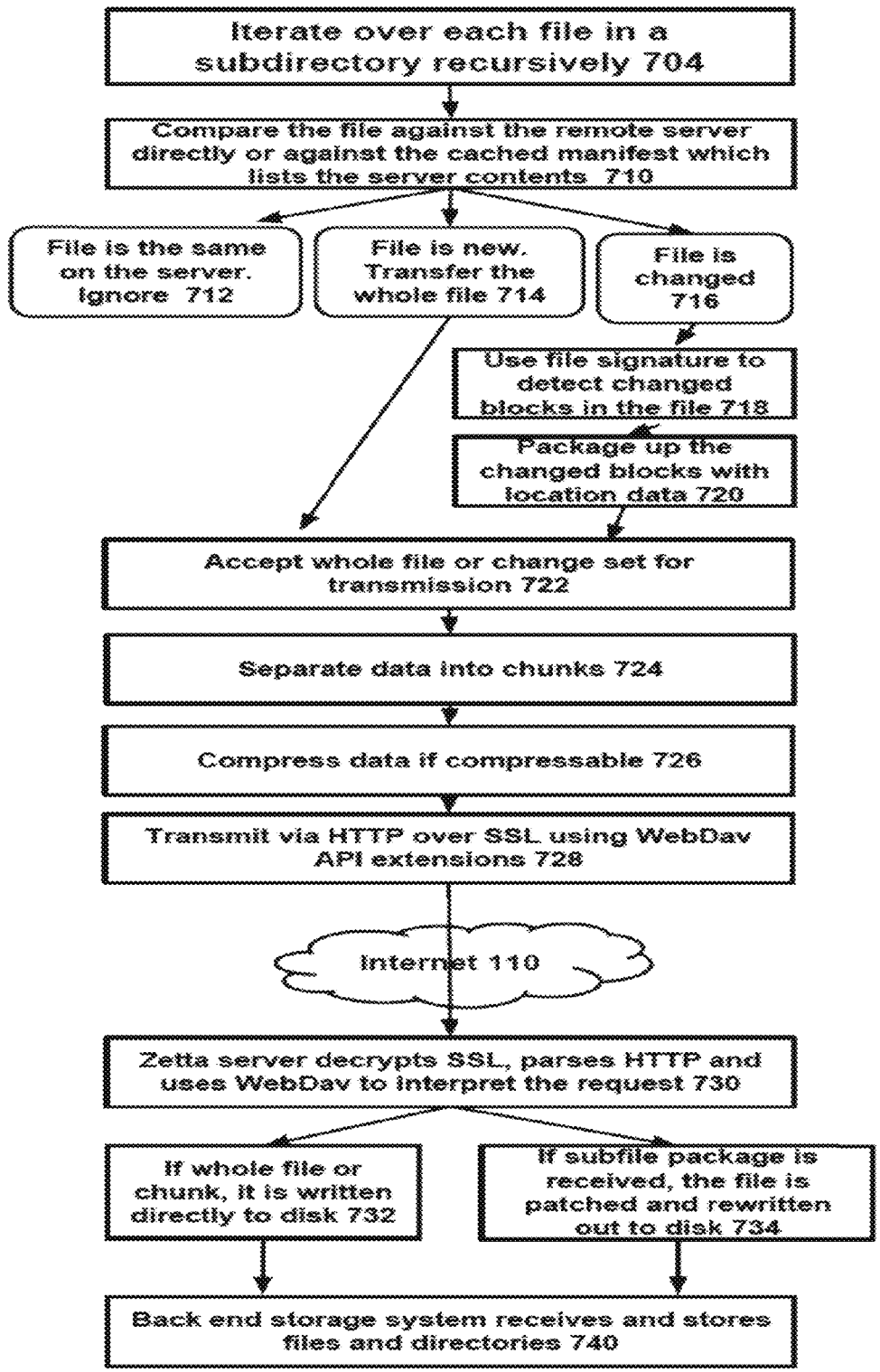
FIG. 8 shows an exemplary process to reduce data transfer for files.

FIG. 8 shows an exemplary process to reduce data transfer for files. The process iterates over each file in a subdirectory in a recursive manner (704). First the process compares the file against the corresponding directory in the remote server directly, or it can compare against a cached manifest which lists server folder contents (710). If the file is the same as the file on the server, the process ignores the file (712). Alternatively, if the file has changed (716), the process detects changed blocks using the file signature (718) and packages the changed blocks with location data (720). If the file is new, the process transfers the new file to the server directory (714). From 714 or 720, the process accepts the whole file or the changed set for transmission (722). Data is separated into chunks (724), and compressed if compressible (726). The data is then transmitted using WebDav API extensions in one embodiment (728) over the Internet 110. At the server, the data is decrypted and parsed using WebDav to interpret the request (730). If the data is for the whole file or a chunk of a file, the process writes the data direct to disk (732). Alternatively, if a sub-file package is received, the file is patched and rewritten to disk (734). From 732 or 734, the back end data storage system receives and stores the files and directories (740).

One implementation of FIG. 8 includes the following operations:

First, the manifest is used to identify locally what files have changed. This is done by traversing all the files in a subdirectory and comparing the cached status of the corresponding file on the server end. If the file is the same it is ignored. If the file in new it is marked for upload and if it has changed, it is passed to the sub-file change detector.

Next, a local sub-file signature cache is consulted to detect insertions, removals, and rearrangements of data in files, so that only the changed portion of the file is transmitted. Changes are wrapped into a container and marked for transmission All uploads that are compressible, as determined by their file types, are compressed with standard compression libraries, the payload is encrypted with SSL, and the payloads are transferred in 10 MB chunks over WebDAV, which is an API that uses HTTP and is designed for moving large amounts of data over WAN connections. Additionally, multiple threads are run in parallel, overcoming slowness or limitations in tcp window scaling adjustments, or handling network "long fat," (high latency high bandwidth) network connections.

At the receiving end the WebDAV server intelligently decrypts, expands the patch sets, and stamps them down onto the file system. This results in the transfer efficiency of an incremental backup, but generates a full backup with snapshots going back in time for version history. Notably, this also results in a mountable/usable files system, as opposed to a backup "blob," that requires processing by the backup software before it is transformed back into a usable state.

Figure 9:
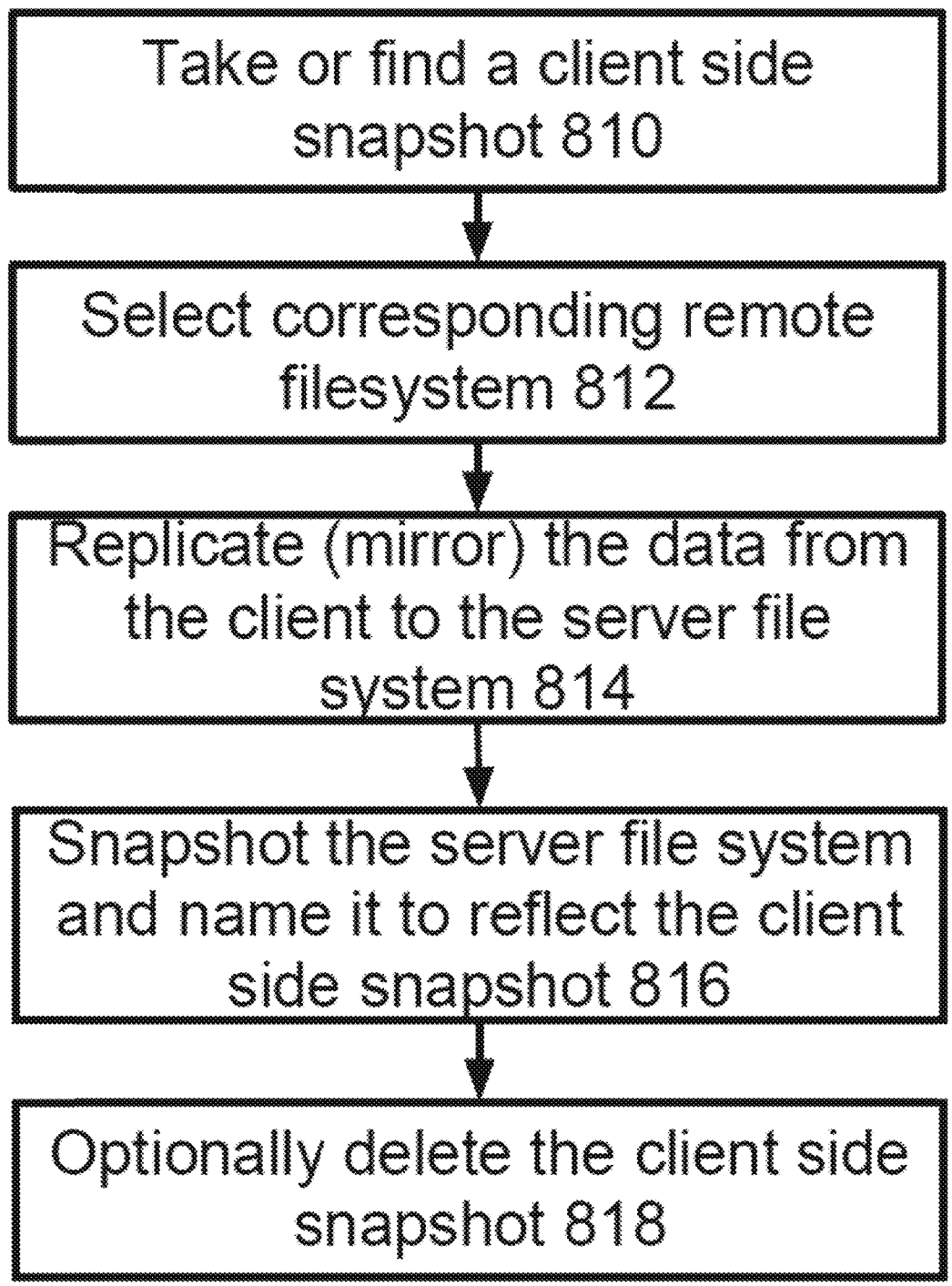
FIG. 9 shows a process for state consistent replication.

FIG. 9 shows a process for state consistent replication. First, the process takes or locates a client side snapshot (810. Next, the process selects a corresponding remote file system (812). The process replicates or mirrors that data from the client to the server file system (814). The process then snapshots the server file system and name the file to reflect the client side snapshot (816). Optionally, the process deletes the client side snapshot (818).

Snapshots are copies of data backup that capture the state of the user files at a point in time. As data changes over time, individual snapshots provide a recoverable copy of previous versions. Benefits That Snapshots Provide:

1. Versioning-enabled backups—In addition to being able to recover data deleted in the past the user can also recover versions of data that may have changed or been corrupted.

2. Incremental Forever—The user can recover files from your backup as if you were doing full backups every day, but the amount of actual storage being used is just 1 full+the daily incremental changes that make up each snapshot.

Snapshots's versioning granularity provides significant advantages over normal backups when recovering a file, file system, or database.

By leveraging client side snapshots (whether VSS, LVM, or on a NetApp filer), snapping the source data, performing the sync, and then snapshotting on the server side results in an identical data set on the server side. This is the same net result as products (and associated claims) such as NetApp SnapMirror or EMC Replication Manager, but operating in a very different mechanism (the aforementioned are block based tracking). The advantage is that it supports heterogeneous storage storage (from any vendor to Zetta, or from any vendor to any vendor).

In one implementation, the process can implement the following steps:

1 Create or find an existing snapshot on the local file system. (client volume)

a On Windows the client can create a new snapshot using VSS.

b On a Netapp the client can interrogate the Netapp to get a list of existing snapshots and then choose an appropriate one such as the last daily snapshot.

2 Use a server side volume that corresponds to the local file system tree. The same volume is used for the first and all subsequent syncs. The server side volume will accept file system changes on the "tip".

3 Perform a master to slave replication step. At the end of this step the server file system "tip" should mirror the contents of the client file system.

a The client software iterates over a dataset by starting with an initial directory and recursively syncing the entire tree.

b Files and directories that exist on the client side but not the server side are assumed to be new and are created on the server side c Files that have changed on the client side are copied to the server side. This may be done by just copying the changes rather than the whole file.

d Any files or directories that are found on the server side but not the client side are assumed to have been deleted and are deleted on the server side.

4 Trigger a snapshot on the server side file system and mark or title it with a relevant name.

a For Netapps use the same name as the snapshot that exists on the Netapp b For Windows name file new snapshot after the current date and time of when the VSS snapshot was taken.

5 By repeating the process a series of snapshots can be created on the remote server that exactly mirror the snapshots on a Netapp appliance or a Windows system. The snapshots on the client side can also be removed knowing that the server holds a copy.

The use of versioning-enabled backups protects data from compliance issues or a natural disaster by pairing snapshots with replication. Rather that storing snapshots compressed, or in a proprietary format, replication makes the backup a fully instantiated file system—in its native format—so disaster recovery becomes as easy as pulling a file off a file server.

Replication Technology is:

1. Block-level Change Detection—Any folder or directory the user adds to the backup during setup will be scanned during each daily backup cycle. Any files that have been modified since the last backup will have just the bytes that have changed replicated across the wire to the backup volume. Since only about 2% of active files are modified during any given day, this feature drastically cuts down the amount of data that needs be transferred.

2. High-Speed, High-Reliability Data Transfers—The WebDAV transfer protocol is optimized for multi-threaded transfers. WebDAV is inherently faster than other data transfer technology since it works over HTTP, just like the internet itself. From the management console in the client software, the user can select the number of threads to use when transferring data.

Figure 10:
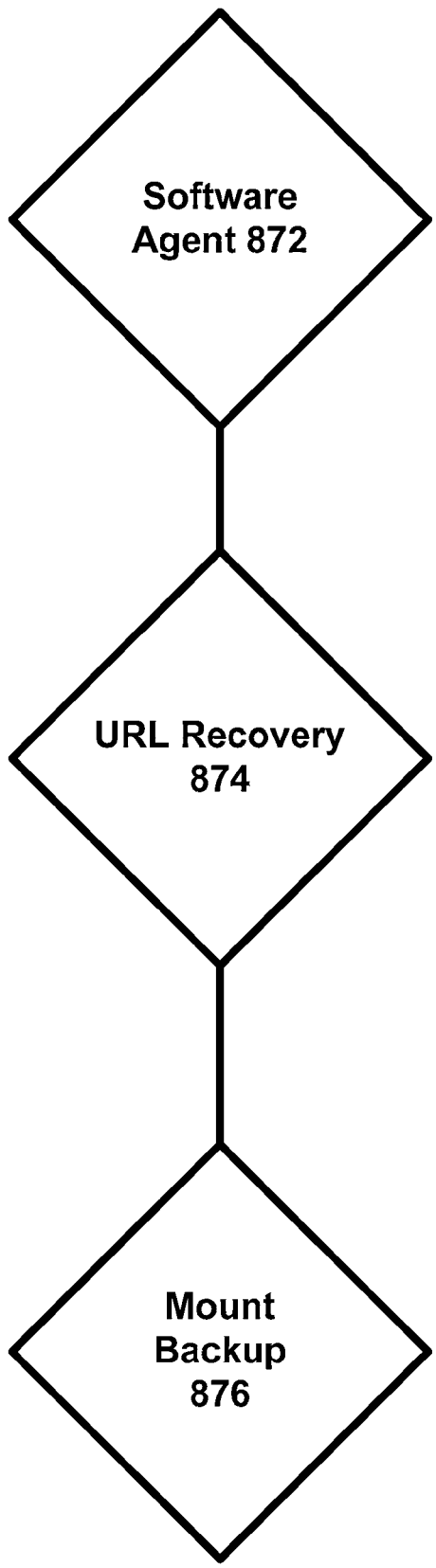
FIG. 10 shows an exemplary process for data recovery.

FIG. 10 shows an exemplary process for data recovery. To recover a file or server, there are easy 3 options. The user can go through the software agent, find the version of the file he or she is looking for from the right day and click, "recover" (872). Or, the user can click a URL that will allow you to recover from your backup directly over the web by showing the replicated file system (874). Lastly, the user can choose to mount the backup as drive so it will show up like any other shared network drive on the user's system (876).

The client software 10 is able to backup data from a NetApp by reading a user generated configuration file which defines the data sources to back up and the appropriate login credentials to gain access to these data sources. When the file is read by Client software 10 network mounts will be created to the defined data sources and the Client software 10 agent will trigger a snapshot on the NetApp appliance which is used to capture a consistent state of the NetApp file system and replicate the targeted data to the System cloud.

The Client software 10 Backup Process

1. Client software 10 agent is triggered to start a job based on user defined backup schedule.

2. Client software 10 agent reads the configuration file and mounts the directory to backup.

3. Client software 10 agent connects to the NetApp and triggers a NetApp snapshot which allows a consistent copy of the data to be backed up.

4. Client software 10 agent walks the directory tree, finds files that have changed and transmits the delta to System.

5. Once the transfer of data is complete System creates a snapshot of the file system on the System storage end.

6. Client software 10 deletes NetApp snapshot and disconnects from the NetApp.

In order to backup data from a NetApp a Client software 10 agent will need to be installed on a system running a supported client software OS. This system will be referred to as the Client software Host and will function as the gateway to the NetApp. The Client software Host should have a good connectivity to both the NetApp and the Internet; latency between the Client software Host and the NetApp will decrease sync performance. Each client software Host will have a user generated configuration file that defines the NetApp server address, login credentials and what data sources the Client software agent is to backup.

In the event of a clustered environment where multiple NetApp heads are in use multiple Client software 10 Hosts will need to be used where each host connects to an individual NetApp head with its own config file for the unique server address.

If the Client software Host is a Windows system, the Client software agent will create a network mount to access the data using an available drive letter. If the Client software 10 Host is a Linux system—the user must create the target directory for the NetApp source to be mounted to and specify this directory in the "mount:" section of the configuration text which is given below in the configuration section.

The OS of the Client software Host will determine the ability of Client software 10 to backup different security styles within the NetApp. Since one of the benefits of utilizing NetApp Qtrees is the ability to store both UNIX and NTFS security styles it is common to have both types and want to maintain both in your backup. To preserve UNIX ACLs the Client software host will need to run on a supported UNIX operating system. Similarly, to preserve NTFS ACLs the Client software host will need to run a supported Windows operating system. If mixed security style is used the recommended best practice is to use a Windows system as the Client software host.

One embodiment of the client software 10 and the server supports simultaneous generation of a local backup on a Windows or NFS share for rapid restore purposes, for mission critical or especially large files, in addition to transferring to the servers. The system does not require an appliance, but only—any mountable shared devices or a USB drive, for example, can be a valid target. An efficient access to version history is available by using the local copy as a "seed," and the system can access server-side snapshot data and transmitting only the patch sets required to revert to any particular version.

Figure 11:
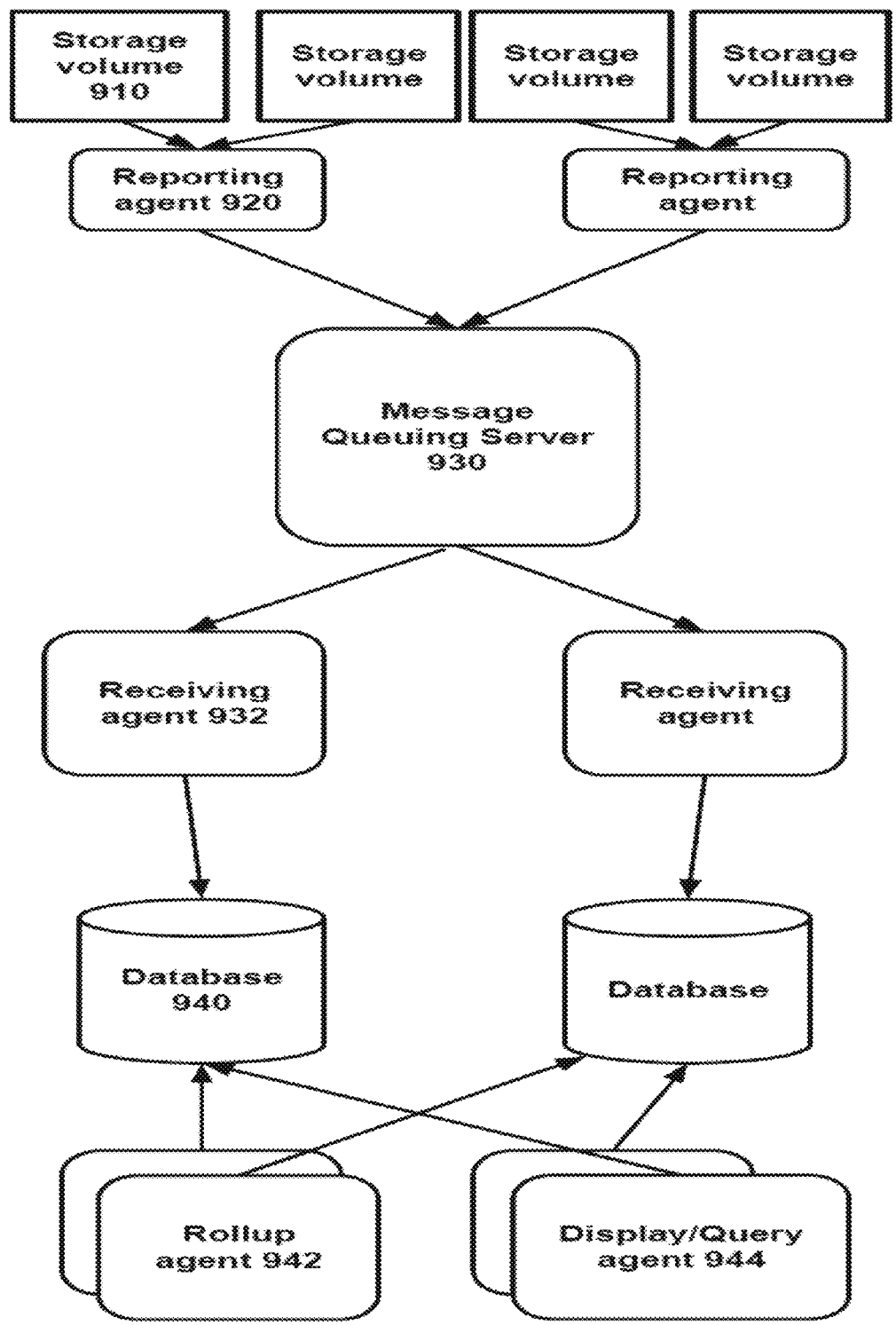
FIG. 11 shows an exemplary real-time billing and metrics reporting process.

FIG. 11 shows an exemplary real-time billing and metrics reporting process. Data from storage volumes 910 are captured by reporting agents 920 and sent to a message queuing server 930. Data is then sent to respective receiving agents 932 and buffered in database 940. Periodically, roll-up agents 942 cumulates the statistics and updates the database 940. Upon demand, a display or query agent 944 retrieves billing and metrics information from the database 940 and renders billing and metrics reports or screen displays for users on-demand.

The System backend has a scalable system for collecting, rolling up, acting on, and displaying an arbitrary set of metrics. Current usage is for customer bandwidth and footprint metrics, but this can be extended over time.

The system storage system consists of a large number of storage volumes that can each operate independently of each other. A single customer can have one or many volumes and the system supports thousands or potentially millions of independent volumes. For the purpose of metrics and billing it is necessary to measure, store and aggregate the storage metrics for each volume in a way that is easily retrieved for graphing, monthly billing, and real time viewing of each customer's volumes.

Storage metrics on each volume are queried on a regularly scheduled basis. In one embodiment they are collected once a minute. Each sample that is collected is packaged into a message format that includes an identifier for the volume (volume_id), a timestamp and the metrics that are collected.

There can be one message for each metric or a combination of one or more messages that include multiple metrics in a message. The metrics are identified by predefined names such as "Read MB/S", "Write MB/S", "Total space in Bytes", "Snapshot space in Bytes", among others.

The messages are sent to a set of message queuing servers that queue the messages and allows for delivery to specific receiving agents. The queuing servers are clustered to support hot failover and are persistent to protect against data loss in the event of a power failure.

A set of receiving agents take messages off the queuing servers and processes them. A receiving agent operates against a persistent database store that holds aggregate metrics for a given volume and is correlated by customer as well. For each new message an entry is added to the database store for the corresponding time. Messages are processed in time sequence order, but this is not a requirement for all such systems.

At specified intervals metrics are "rolled up" to reduce the granularity of the data. For instance, after multiple months of data collection the oldest points in the database can be averaged to daily samples rather than by the minute. This reduces the number of samples by a ratio of 1440 to 1 while still providing a daily view of the dataset. Averaging can be accomplished by calculating the mean, the peak or other well established averaging methodologies. Roll ups are calculated by querying the database for a specified roll up interval, receiving the data, calculating the average and then writing out a new rollup entry in the database. Old data points are then removed from the database.

Agents that display the data or perform billing aggregation are able to query the database for any time range. In some cases a time range will contain a rollup metric rather than a normal reporting interval. When rollup metrics are found they replace an interval of normal data and can be used to calculate averages of larger time periods or for the graphical display of time series metrics. In the system there are billing agents that aggregate monthly metrics into a monthly bill based on average or maximum storage for the month, and average, actual, or maximum bandwidth for the month. System also displays time series graphs of individual and aggregate volumes with multiple time scales. High level graphs show monthly or daily intervals and allow zooming down to the lowest level data granularity.

Figure 12B:
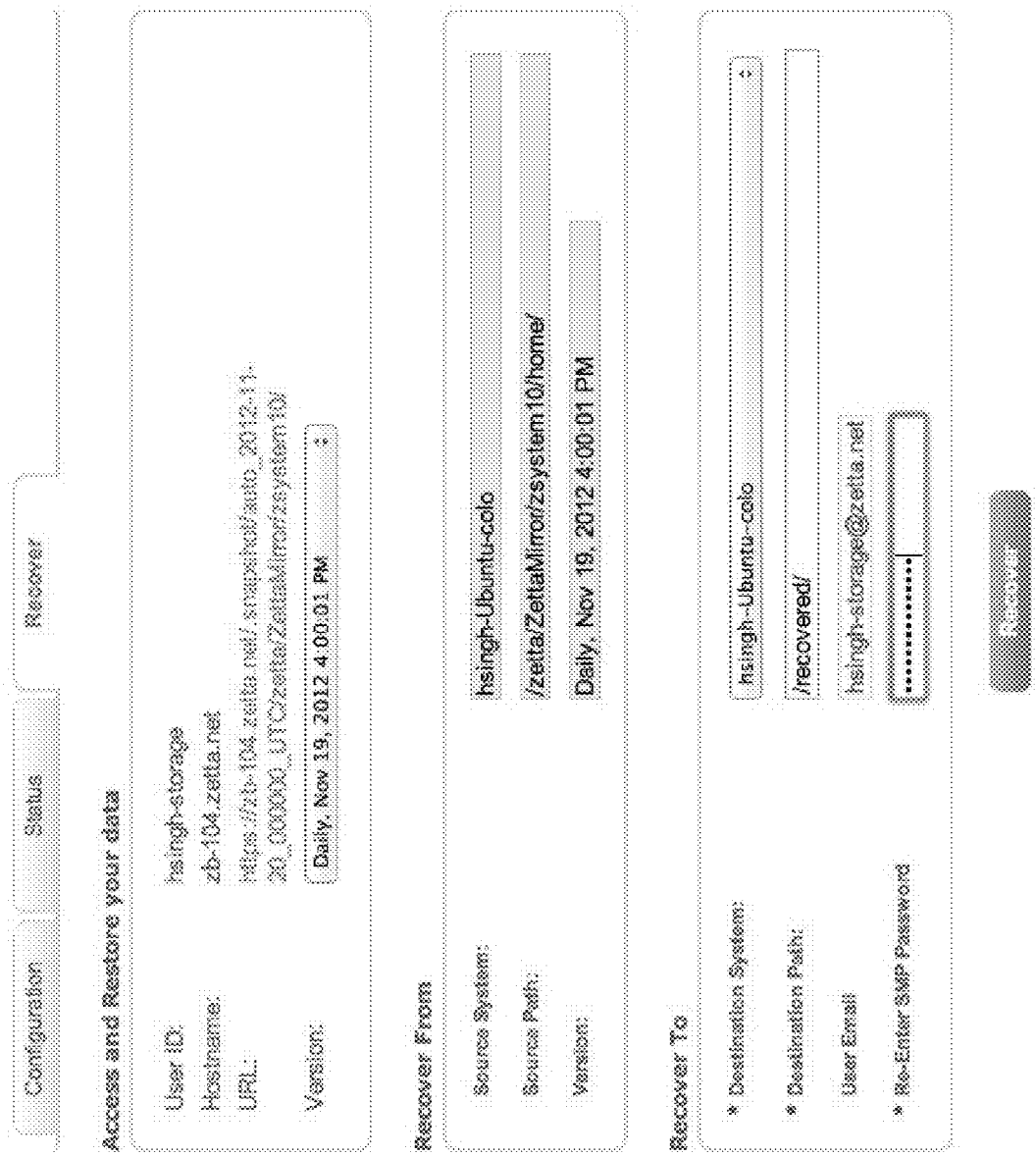

FIGS. 12A-12H show exemplary user interface screens. FIG. 12A shows an exemplary Client Download selection screen. The screen allows the user to download and install any number of copies of the lightweight client onto the servers, VMs and executive laptops. Once the client software is installed, all configuration and management is done through a web browser.

FIG. 12B shows an exemplary configuration and recovery screen. This screen enables a two-click set-up process where the user selects what time and what data to protect. On schedule, the client software wakes up, finds changes that have occurred since the last sync window, and then sends only the changed blocks to servers in the system, where they are patched into the replica copy, bringing the backup current.

Figure 12C:
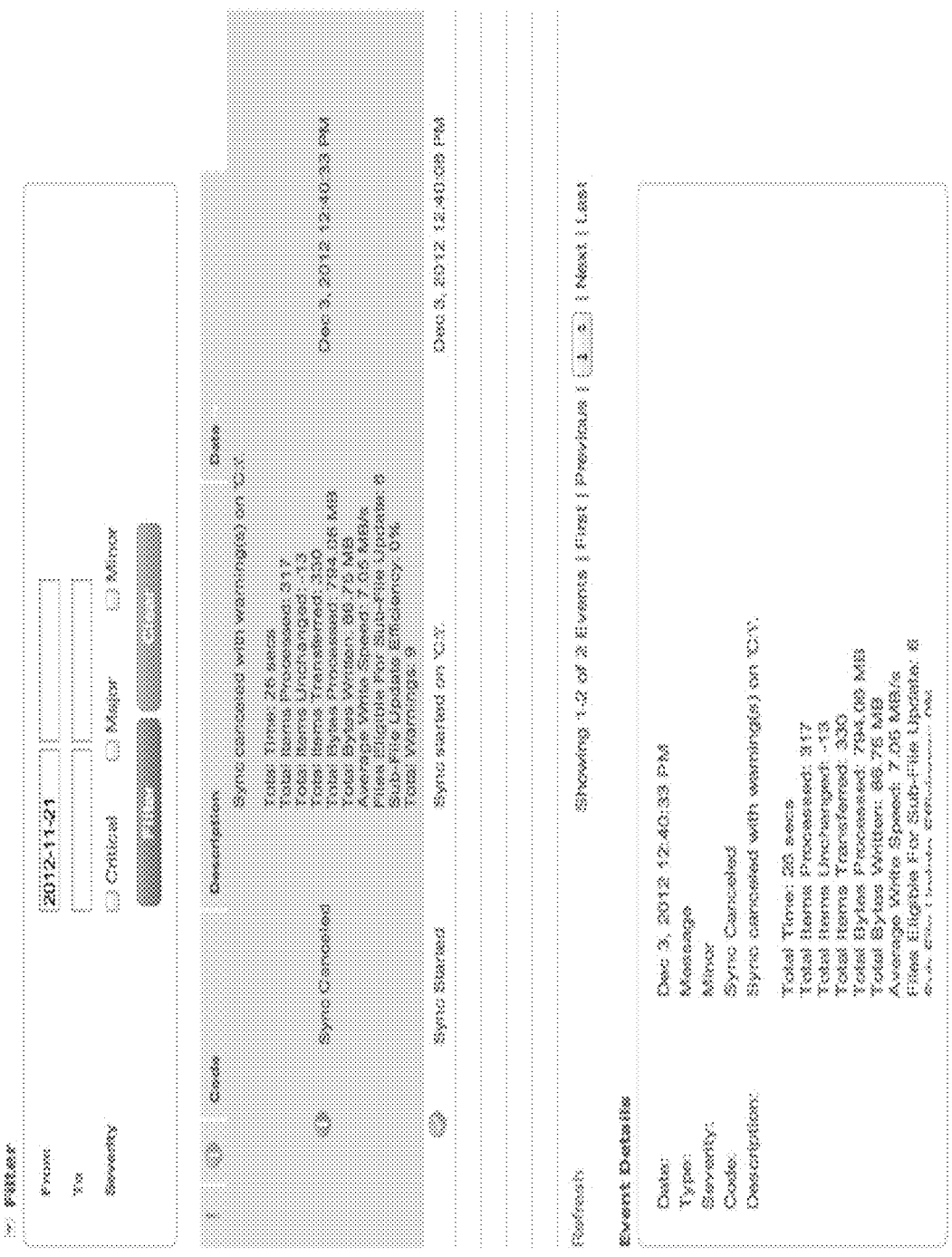

FIG. 12C shows an exemplary screen showing Online Status. The sync status history is always available on the web.

FIG. 12D shows an exemplary Daily Digest report. Every day, the user receives a "Daily Digest" email depicting the success of all the systems' syncs from the prior 24 hours. No need to dig around for peace of mind.

FIG. 12E shows an exemplary Automated Versioning report. The system automatically snapshots the backup copy (daily is the default) creating an online, mountable retention history.

Figure 12F:
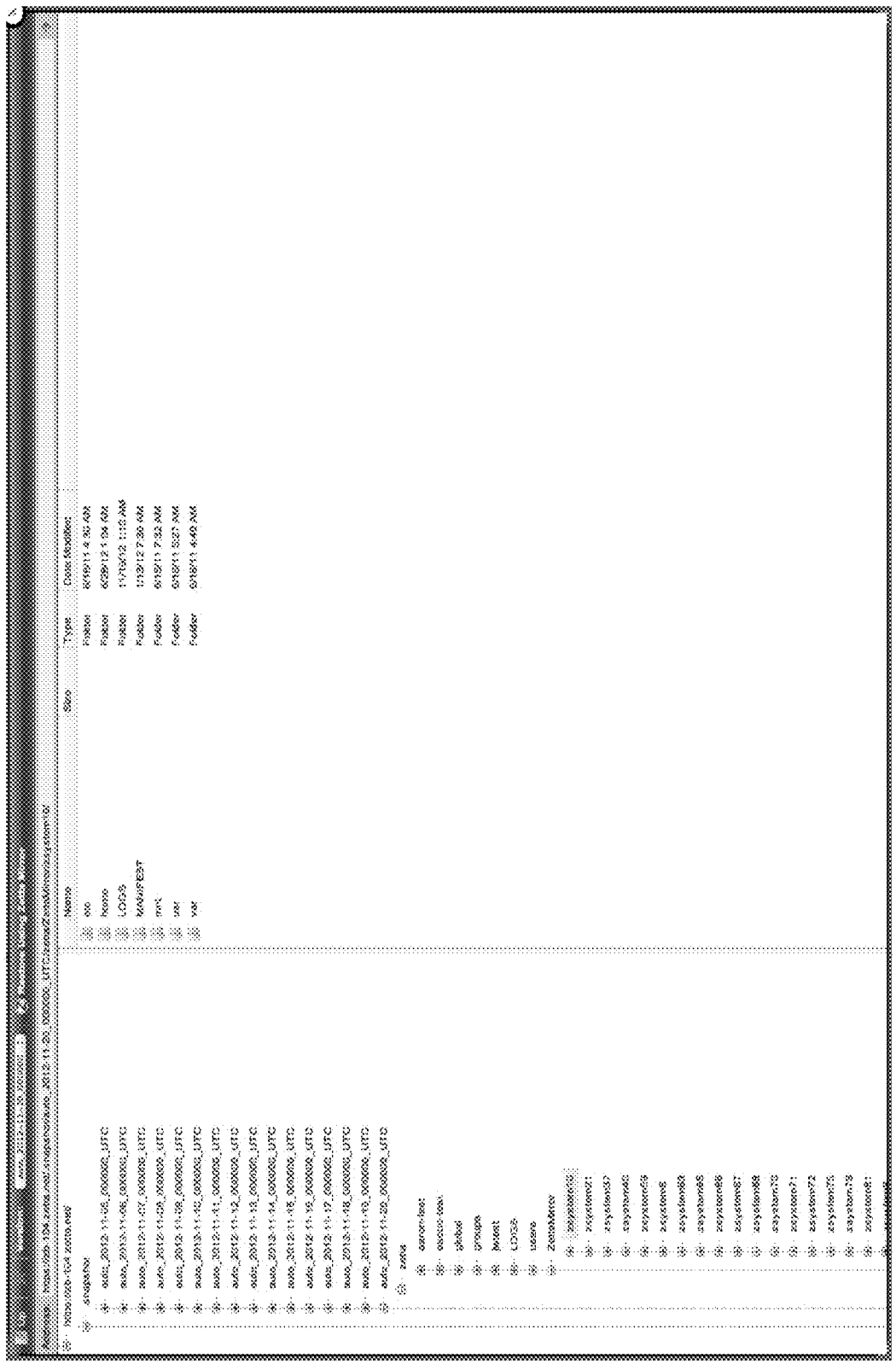

FIG. 12F shows an exemplary screen showing Data Recovery and Web Access to Data. The user can access the backup data is with just a web browser . . . from anywhere. Data is mirrored in the same file structure at the computer that the user operates. This allows instant recovery/access to any files, folders, or entire file systems.

Figure 12G:
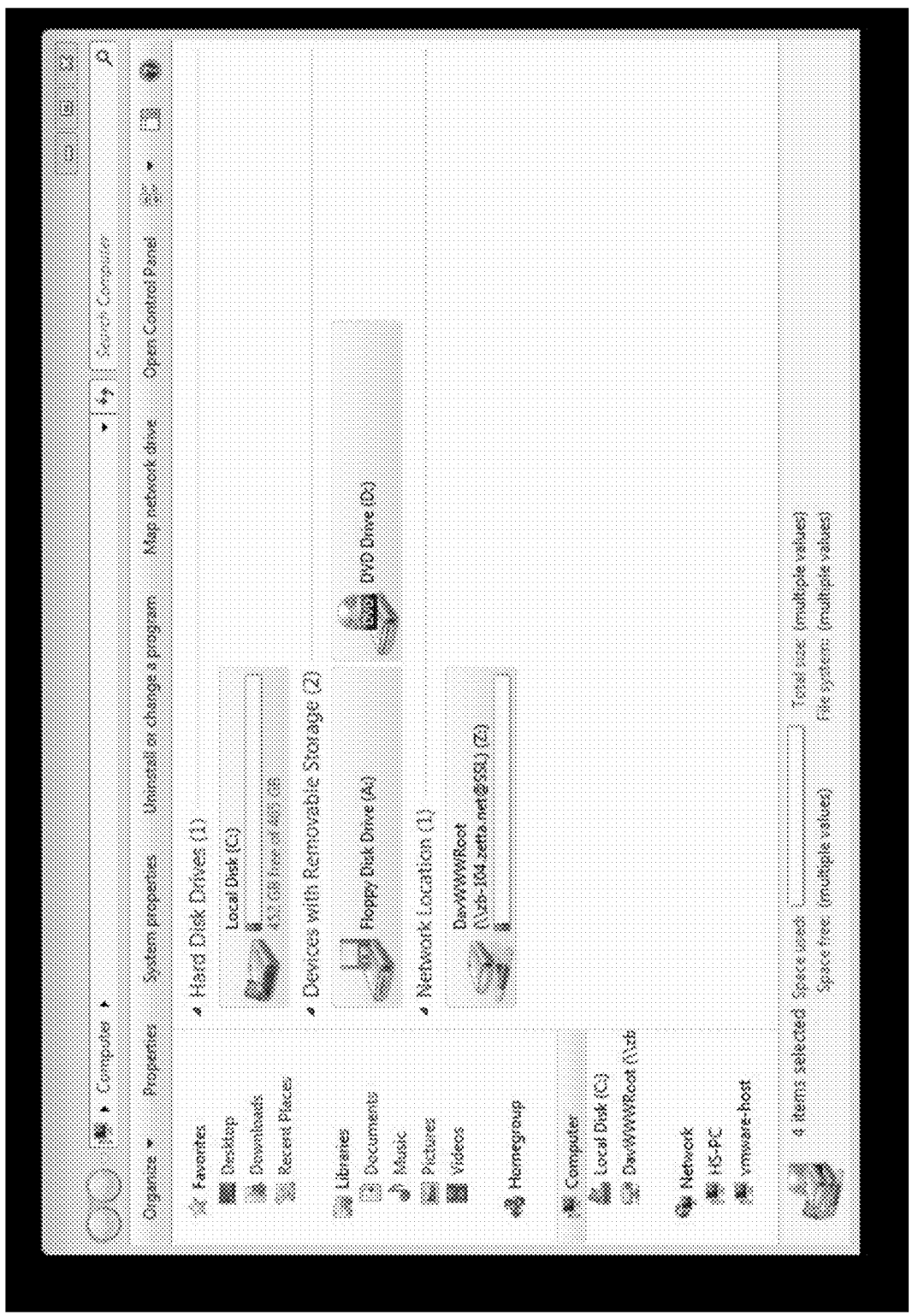

FIG. 12G shows an exemplary user interface for mapping a drive for recovery. The user can access the data is with a mapped network drive. Since data is stored at the server in file system format, the user can simply map a local drive to the remote storage copy and directly access files with workstation tools and applications.

Figure 12H:
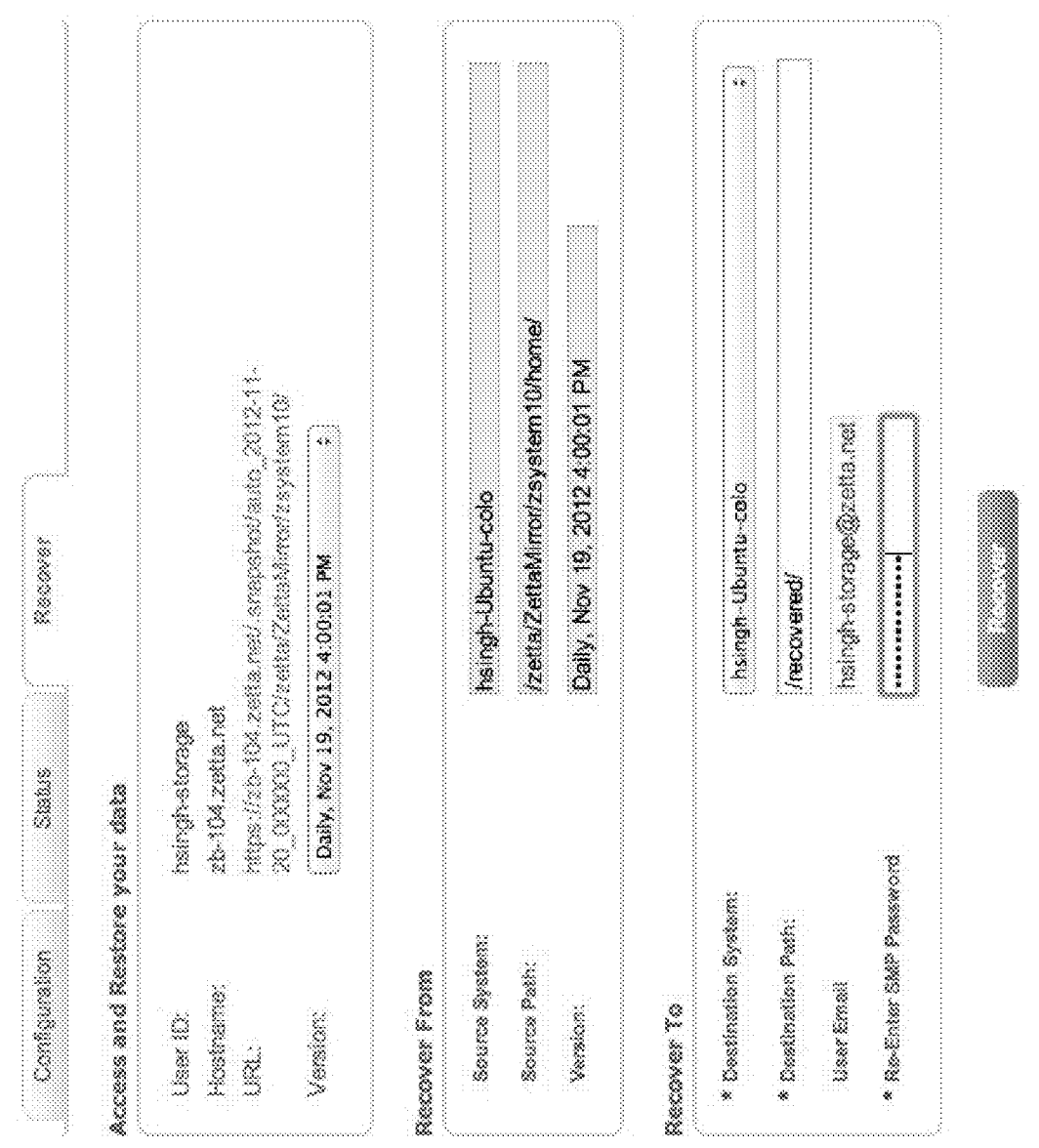

FIG. 12H shows an exemplary data recovery screen using Local Restore. The third way to recover/access data is to copy it back to a local server, either the original server that hosted the data or another one (possibly in another location). The user can simply point to the data he or she wants to restore, and the version needed, and the client software 10 will pull it back down from the cloud.

Figure 13:
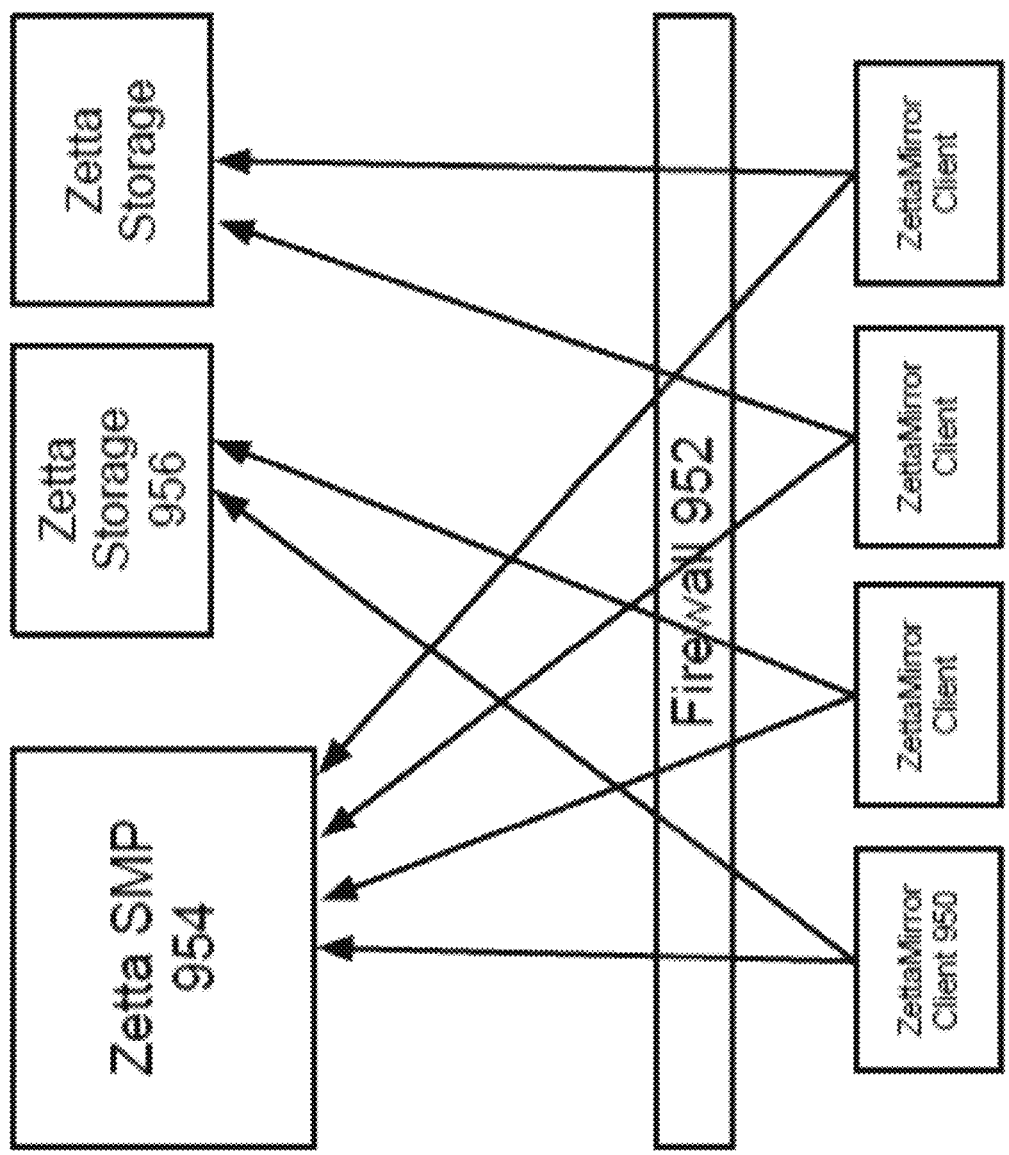
FIG. 13 shows an exemplary approach for managing customer clients.

FIG. 13 shows an exemplary approach for managing customer clients. The design goal is to create a network of clients that are centrally controlled and monitored while requiring a minimum of changes to a customer's network topology. The system has a plurality of clients 950 such as ZettaMirror clients communicating through Firewall 952 to the SMP 954 and one or more storage silos 956. ZettaMirror clients are installed by a customer on each machine that requires a backup. After registration the client registers itself as a service and runs continuously on the host machine. The client service initiates a connection to the Zetta SMP using secure HTTP over SSL. Whenever the SMP wishes to send a command to the client the existing HTTP connection is used. The client will periodically refresh the HTTP connection to prevent it from getting stale and will automatically reconnect whenever the connection is lost. If for whatever reason the SMP is unavailable the client will continue to try and connect on a periodic basis until the SMP can be reached. Status information is also sent via output HTTPS connections but sent to a separate service URL, this can be done in parallel with the control connection. The control connect is used to send the client a schedule for when it should perform backup, sync or other actions. The schedule can be used to initiate a timed action even if the control connection is unavailable when the timed action is set to fire. As long as the remote storage is available the sync or backup can proceed as normal. This isolates SMP failures from interrupting the sync or backup schedules.

Using the above methodology the client never needs to accept an incoming TCP connection, but is always available to be sent a control message. All of the clients connect over the public internet or via private leased lines to a centralized SMP cluster and are able to be managed through a single interface.

The system data protect service is designed to be as simple as possible to configure and operate. The system enables a high performance cloud storage that looked and performed like a storage appliance. A real file system back end allows the system to offer a replication solution that is far more powerful than just backup. The system volume is mountable similar to a network attached storage system within existing enterprises. This allows for greater flexibility and true disaster recovery and archive functionality. The system is a three in one solution that offers greater functionality than traditional backup while replacing existing enterprise backup solutions.

A standards based file access protocol is used. The system supports the WebDav file access protocol which allows for file access from a large variety of third party software products including native access within Windows and Mac. WebDav is an internet friendly protocol built upon HTTP that incorporates encryption and WAN efficiency as well as a wide range of file operations to support remote file system operations. Through this technology, customers are able to mount a network drive on a desktop or server and directly access the system archives, including snapshot versions.

The system supports and requires encryption for every interaction with the system service. HTTPS and SSL, is required for all interaction with the service and is used to secure all file transfers. Additionally, all files stored are encrypted at rest with file encryption techniques originally designed for military and government use.

The system readily syncs very large data sets. Very large data sizes with large files (50 TB or more) as well as data sets with tens of millions of small files are both handled through a combination of technologies which support:

Rapid and efficient change detection for large numbers of files (See "Manifest") Only changed files to be examined for possible transfer.

Sub-file change detection reduces the amount of data that needs to be sent.

Compressible data is compressed and the end result is checksummed against the original to detect errors.

WAN efficient protocols that can efficiently utilize any available size, internet connection.

Configurable parallelism for multi-processor efficiency and high latency connections, or backing up NAS/SAN or RAID arrays with multiple disks Fast back end. The file servers are optimized for the application and are able to receive data very quickly. Single data silos can obtain write speeds of hundreds of MB/sec. Restores represent less than 1% of the load and are exceptionally fast due to a surplus of read IOPS and bandwidth.

The system is extremely efficient at iterating and detecting individual changes scattered throughout very large data sets. The manifest technology can scan and detect changes within single data sets with many files, even over 100 million files in one embodiment. The system is able to do this without causing significant memory, CPU, or mass storage IO load on the host system. The system has a scan rate capable of running within small backup windows.

The data mover can transfer data over the internet at the maximum possible speed. The system can handle sub-file change detection. Many programs, databases in particular, continuously update existing files. Many backup programs are forced to reimage the entire file even if only a small portion of it has changed. The system keeps a small signature of every large file that it encounters and is able to use that signature efficiently to find blocks within changed files that have real differences. The change detection is able to detect blocks changed in place, data added to the end of files and data shifts. The system has optimized the algorithm to be especially efficient for databases and to use a minimum of signature storage space. A digital signature is generated on every file. Every file that enters the system backend system is checksummed using the SHA1 cryptographic hash algorithm. The checksum is stored separately from each file and can be referenced as a method of verifying that the data stored at The system is still valid. The client software uses this checksum to perform end to end verification of data integrity and the system backend is also able to use the checksum for data scrubbing purposes.

SHA-1 is a cryptographic hash function designed by the United States National Security Agency and published by the United States NIST as a U.S. Federal Information Processing Standard. SHA stands for "secure hash algorithm". The four SHA algorithms are structured differently and are distinguished as SHA-0, SHA-1, SHA-2, and SHA-3. SHA-1 is the most widely used of the existing SHA hash functions, and is employed in several widely used applications and protocols. SHA-3, was announced on Oct. 2, 2012.SHA-1 produces a 160-bit message digest based on principles similar to those used by Ronald L. Rivest of MIT in the design of the MD4 and MD5 message digest algorithms, but has a more conservative design. The original specification of the algorithm was published in 1993 as the Secure Hash Standard, FIPS PUB 180, by US government standards agency NIST (National Institute of Standards and Technology). This version is now often referred to as SHA-0.

Each incremental change is applied to a full in such a way that a new full is generated. Using snapshot technology the system is able to keep a configurable number of full backups, space efficiently and with instant access and no rebuild time. Additionally, since a new full is generated after every backup, the system never needs to take a new full backup, which saves even more time. The net effect is that any file from any version is instantly available for restoring from the system.

Snapshots represent an immutable and verifiably correct representation (because the snapshots also contain the SHA1 hashes) of the source data. The snapshots are space efficient such that if 128 k of a 10 MB file changes (after one or more snapshots were taken) the total space utilized is only 10 MB+128 k (plus small amount of overhead). Each snapshot only grows the total data set size by the amount of unique data that changed during that period. The system is able to emulate traditional tape rotation schedules through snapshot promotion, walking through 30 dailies, 12 monthlies, and as many yearly snapshots as required.

The system backend creates snapshots on both a scheduled basis as well as "snap after sync," for data consistency. Snapshots are a point in time "frozen," version of the file system. For databases, but also other types of applications, going through and copying up file by file doesn't work because more than a single file needs to be captured at a single point in time (imagine a book where each page is a file, any time a page was updated or inserted the index or table of contents would need to be updated as well). The system supports VSS snapshots on the Microsoft platform on the client side as a method of freezing the source data. Finally, snapshots power a geo-diverse replication.

The system protects service along with agents that allow for complete automation of the backup/DR process. The end to end nature of the system service and the lack of any required client side appliances allows for complete automation with no customer level intervention. Legacy based backup systems are notorious for breaking easily and requiring weekly intervention. The system Service architecture detects and automatically fixes most common problems. The system employs two different automatic upgrade systems. The backend service is upgraded automatically and usually with zero downtime. All service upgrades, disk failures, storage upgrades, networking, among others, are handled by the system with no customer involvement necessary. The system's agents also are capable of a fully automated upgrade process or one controlled by the end user at their discretion. All commonly deployed windows versions, multiple mac versions and a plurality of versions of Linux are supported by the system. A file system abstraction layer allows for all meta data to be stored in a platform neutral way on a single customer volume allowing for mixed used in a heterogeneous environment. All the clients are managed in a common way through the web based configuration platform further reducing complexity in a heterogeneous environment.

The system uses light weight agents and a SAS backend to replace existing heavyweight hardware solutions. Customers can sign up, provision and deploy within minutes rather than months. Additionally, since there is no hardware to maintain, most customer problems can be solved proactively by support personnel or over the phone.

The Web-based System Management Portal (SMP) is used to manage, configure, recover and report on data protection jobs—The system's web based configuration portal technology allows for the configuration and management of customer systems in a single place from a single sign-on. All system status is available from a single page and is greatly simplified over traditional distributed systems. The single portal concept is a "must have" feature for busy system administrators and makes the entire system deployment, configuration and maintenance experience seamless and easy.

The system supports multiple methods for customer restores based on the customer need at the time. The system agent performs batch restores of large numbers of files using the same techniques used to backup the data. A la carte restores are possible through a web based file browser that replicates the look and feel of a native file explorer. The system's mount capability offers even more flexibility for the customer. By mounting the system storage volume on a desktop or server, the customer can have read only on demand access to any version of their backed up files.

The system's customers receive daily digest reports that summarize customer activity allow customers to know that everything is protected without having to actively monitor the system. The system has native database backup and restore software to make the process simple and automated. The system's MS-SQL backup connector automatically checkpoints the database, writes a current copy, detects and uploads the sub file changes and allows for a local copy to be saved on any available direct attached or network attached file system.

The system's Netapp replication product can perform a near equivalent Snap Mirror replication without the need to purchase SnapMirror, another Netapp appliance, and set up another data center. The system is able to create and replicate NetApp snapshots and recreate the snapshots—identically—on the system backend service. Customers can reap the benefits of SnapMirror for a small fraction of the cost and can simultaneously reduce vendor lock in for their storage appliance.

The use of a real file system back end allows the system to offer a replication solution that is far more powerful than just backup. The system volume is mountable similar to a network attached storage system within existing enterprises. This allows for greater flexibility and true DR and archive functionality. The system is a three in one solution that offers greater functionality than traditional backup while replacing existing enterprise backup solutions. The system supports the Webdav file access protocol which allows for file access from a large variety of third party software products including native access within Windows and Mac. Webdav is an internet friendly protocol built upon HTTP that incorporates encryption and WAN efficiency as well as a wide range of file operations to support remote file system operations. Through this technology, customers are able to mount a network drive on a desktop or server and directly access the system archives, including snapshot versions. The system supports and requires encryption for every interaction with the system service. HTTPS and SSL, which were invented and standardized by the company co-founders, is required for all interaction with the service and is used to secure all file transfers. Additionally, all files stored at the system are encrypted at rest with file encryption techniques originally designed for military and government use. The system readily syncs very large data sets. Very large data sizes with large files (50 TB or more) as well as data sets with tens of millions of small files are both handled through a combination of technologies which support:

Rapid and efficient change detection for large numbers of files (See "Manifest") Only changed files to be examined for possible transfer.

Subfile change detection reduces the amount of data that needs to be sent.

Compressible data is compressed and the end result is checksummed against the original to detect errors.

Wan efficient protocols that can efficiently utilize any available size internet connection.

Configurable parallelism for multi processor efficiency and high latency connections, or backing up NAS/SAN or RAID arrays with multiple disks Very fast back end. Our file servers are optimized for our application and are able to receive data very quickly. Single data silos can obtain write speeds of hundreds of MB/sec. Restores represent less than 1% of the load and are exceptionally fast due to a surplus of read IOPS and bandwidth.

The system developed its "manifest" technology to be able to scan and detect changes within single data sets with hundreds of million files. The system is able to do this without causing significant memory or CPU load on the host system and has a scan rate capable of running within small backup windows. The WAN optimized data mover efficiently moves data over the internet at the maximum possible speed. The first versions were designed by one of the original architects of the HTTP protocol and embodied more than a decade of experience in WAN optimization to achieve greater than Gb/sec speeds.

Many programs, databases in particular, continuously update existing files. Many backup programs are forced to reimage the entire file even if only a small portion of it has changed. The system keeps a small signature of every large file that it encounters and is able to use that signature efficiently to find blocks within changed files that have real differences. The change detection is able to detect blocks changed in place, data added to the end of files and data shifts. The system has optimized the algorithm to be especially efficient for databases and to use a minimum of signature storage space.

A Digital Signature is saved on every file—Every file that enters the system backend system is checksummed using the SHA1 cryptographic hash algorithm. The checksum is stored separately from each file and can be referenced as a method of verifying that the data stored at the system is still valid. The system uses this checksum to perform end to end verification of data integrity and the system backend is also able to use the checksum for data scrubbing purposes.

Reverse incremental backups can be done. Traditional incremental backups are known for substantially reducing the time for nightly backups. Incrementals only backup the files that have changed and store them in a changeset. The problem with most incremental technologies is that restores need to be built up from the last full plus any and all incrementals. The restore process can take a very long time to rebuild the state just to get to the point where you can restore a single file. The system takes a different approach. At The system each incremental change is applied to a full in such a way that a new full is generated. Using our snapshot technology we are able to keep a configurable number of full backups, space efficiently and with instant access and no rebuild time. Additionally, since a new full is generated after every backup the system never needs to take a new full backup, which saves even more time. The net effect is that any file from any version is instantly available for restoring from the system.

The system backend creates snapshots on both a scheduled basis as well as "snap after sync," for data consistency. Snapshots are a point in time "frozen," version of the file system. For databases, but also other types of applications, going through and copying up file by file doesn't work because more than a single file needs to be captured at a single point in time (imagine a book where each page is a file, any time a page was updated or inserted the index or table of contents would need to be updated as well). The system supports VSS snapshots on the Microsoft platform on the client side as a method of freezing the source data. Finally, snapshots power our geo-diverse replication. Snapshots, as an immutable and verifiably correct representation (because the snapshots also contain the SHA1 hashes) of the source data, enables our solutions in the SEC 17a-4 compliance space for broker/dealers. In one embodiment, the snapshots are space efficient such that if 128 k of a 10 MB file changes (after one or more snapshots were taken) the total space utilized is only 10 MB+128 k (plus small amount of overhead). Each snapshot only grows the total data set size by the amount of unique data that changed during that period. The system is able to emulate traditional tape rotation schedules through snapshot promotion, walking through 30 dailies, 12 monthlies, and as many yearly snapshots as required.

The data protect service along with agents that allow for complete automation of the backup/DR process. The end to end nature of the system service and the lack of any required client side appliances allows for complete automation with no customer level intervention. Legacy based backup systems are notorious for breaking easily and requiring weekly intervention. The system Service architecture detects and automatically fixes most common problems.

The system employs two different automatic upgrade systems. The backend service is upgraded automatically and usually with zero downtime. All service upgrades, disk failures, storage upgrades, networking, among others, are handled by The system with no customer involvement necessary. The system agents also are capable of a fully automated upgrade process or one controlled by the end user at their discretion.

The system uses light weight agents and a SAS backend to replace existing heavyweight hardware solutions. Customers can sign up, provision and deploy within minutes rather than months. Additionally, since there is no hardware to maintain, most customer problems can be solved proactively by system support personnel or over the phone. The system maintains a full end-to-end solution.

The Web-based System Management Portal (SMP) to manage, configure, recover and report on data protection jobs—The system's web based configuration portal technology allows for the configuration and management of customer systems in a single place from a single sign-on. All system status is available from a single page and is greatly simplified over traditional distributed systems. The single portal concept is a "must have" feature for busy system administrators and makes the entire The system deployment, configuration and maintenance experience seamless and easy.

A simple and flexible restore process is provided. The system supports multiple methods for customer restores based on the customer need at the time. The system's agent performs batch restores of large numbers of files using the same techniques used to back up the data. A la carte restores are possible through a web based file browser that replicates the look and feel of a native file explorer. The system's mount capability offers even more flexibility for the customer. By mounting the system storage volume on a desktop or server, the customer can have read only on demand access to any version of their backed up files.

The user and system support staff receive daily digest reports that summarize customer activity allow customers to know that everything is protected without having to actively monitor the system.

Enterprise connectors are provided for Databases—Databases require a complex series of steps in order to backup and restore. The system has developed native database backup and restore software to make the process simple and automated. The system MS-SQL backup connector automatically checkpoints the database, writes a current copy, detects and uploads the sub file changes and allows for a local copy to be saved on any available direct attached or network attached file system.

The system's Netapp replication product can perform a near equivalent Snap Mirror replication without the need to purchase SnapMirror, another Netapp appliance, and set up another data center. The systemMirror is able to create and replicate NetApp snapshots and recreate the snapshots—identically—on the The system backend service. Customers can reap the benefits of SnapMirror for a small fraction of the cost and can simultaneously reduce vendor lock in for their storage appliance.

The system was built from the ground up to scale to Trillions of objects at Exabyte scale and beyond. Each storage silo is horizontally scalable to near infinite number of nodes. The system configuration and management system ties the nodes together in a shardable and easily scalable way to support potentially millions of volumes and organizations. The Authentication and networking infrastructure is based around industry standard mechanisms that Netscape helped to establish in the 90's and have proven to scale to internet wide levels.

The system has custom built the billing metrics systems using traditional SQL database methodology to produce a very reliable yet scalable system. The system can support a large number of flexible subscription billing features.

The system has built a fully automated provisioning system that allows for new customer signup and service delivery with no human interaction. This allows for complete automation of the customer acquisition process, partner provisioning of new customers and the ability for customers to add additional separate storage volumes directly through our web based configuration platform. The customer is able to choose the desired location of the new volume from a geographic list of The system data centers. The system can increase operational efficiency and allows for rapid growth. The storage volumes are provisioned from multiple sets of available physical storage that are expanded just ahead of demand based on growth projections.

Geographically Diverse Data Centers are used for disaster recovery purposes. Two first-class shared-nothing facilities provides for a geo-replication option. With geo-replication, the customer receives two volumes, one primary (read/write)

and one secondary (read only). Read access to the secondary is available continuously. Replication is based on snapshots which fire on a timer, typical propagation delay is about 4 hours in one implementation. All logical management is done remotely, and only technician level personnel are required locally.

Shared Nothing Data Protection can be provided to customers who do not elect the Geo-diverse replication option. Their data is replicated to a second, shared-nothing storage silo. From an application point of view, it is the same process as the geo-replication, except it is going to a local target. Customers do not have access to this data set and additional file system compression is enabled, but it is there to prevent against logical corruption issues.

Aside from application metrics, several thousand system metrics are monitored, ensuring awareness of system problems in real time. The system has extended monitoring of disk drives, and frequently proactively pre-fails them when they show excessive read or write errors or other indications of a failing drive.

It will also be recognized by those of ordinary skill in the art of computer programming that the method of FIGS. 1A-1B and the functional modules of the remaining figures may be embodied as a series of instructions organized into one or more computer programs which are executable by a programmable control device. A programmable control device may be a single computer processor, a plurality of computer processors coupled by a communications link, or a custom designed state machine. Custom designed state machines may be embodied in a hardware device such as a printed circuit board comprising discrete logic, specially designed application specific integrated circuits (ASICs), or integrated circuits such as field programmable gate arrays (FPGAs). Storage devices suitable for tangibly embodying computer programs include all forms of non-volatile memory including, but not limited to: semiconductor memory devices such as electrically programmable read only memory (EPROM), electrically erasable programmable read only memory (EEPROM), and flash devices; magnetic disks (fixed, floppy, and removable); other magnetic media such as tape; and optical media such as CD-ROM disks.

While the invention has been disclosed with respect to a limited number of embodiments, numerous modifications and variations will be appreciated by those skilled in the art. It is intended, therefore, that the following claims cover all such modifications and variations that may fall within the true spirit and scope of the invention.

What is claimed is:

1. A data recovery system, comprising:
 a plurality of customer computers to be backed-up, each customer computer running a client software to communicate back-up data files including generating a first sub-file signature for one or more segments of a changed file; and subsequently generating another sub-file signature for each file segment and comparing them to detect insertions, removals, or rearrangements of data in the file and storing a plurality of signatures for each file locally on the computer representing the latest state of each file uploaded to a server; and transmitting one more changed segment(s) in the file, writing a manifest file reflecting the new target state as an incremental backup; compressing, encrypting and transmitting the changed segment through a Web-based Distributed Authoring and Versioning application program interface; expanding one or more patch sets and saving the patch sets with the file system to provide an incremental backup while generating a full backup; taking a snapshot after a full backup providing for a version history; mapping the file data and meta data to an arbitrary file system; and saving one or more snapshots of the meta data on the distributed meta data store for a subsequent reconstructing of files for the arbitrary file system;
 a system management platform coupled to the client software over the Internet, the system management platform receiving inputs from a web user portal to control operations of the client software and the system management platform to back up the customer computer; and
 two or more data storage silos, each including:
  a plurality of storage directors communicating with the client software; and
  a clustered data storage array,
 wherein the data storage array comprises Redundant Array of Independent Nodes (RAIN) 6 storage nodes that ensures that even if two storage nodes go down that data is still available and RAIN protects a node, or server, cluster from failure.

2. The system of claim 1, comprising a backend monitoring system.

3. The system of claim 1, comprising a metrics and billing system.

4. The system of claim 1, wherein the storage director comprises routers, load proxy units coupled to the routers, and servers coupled to the load proxy units.

5. The system of claim 1, wherein each data storage silo comprises a shared-nothing geographically dispersed data center.

6. The system of claim 1, wherein the client software communicates using Web-based Distributed Authoring and Versioning to collaborative updating and management of files on remote web servers and wherein the client software selects the number of threads.

7. The system of claim 1, wherein the client software comprises a configurable parallelism selection for multi-processor efficiency and high latency connections, or for backing up NAS/SAN or RAID arrays with multiple disks.

8. The system of claim 1, wherein the data storage silos comprises a pair of head nodes and a plurality of storage nodes.

9. The system of claim 8, wherein each storage node comprises a computer with an open sourced operating system and one or more data storage devices.

10. The system of claim 8, comprising an on-disk encryptor to generate clear text and sent over an Internet Small Computer System Interface (iSCSI).

11. The system of claim 10, wherein iSCSI traffic is load balanced and fails over network links and connected to a plurality of switches.

12. The system of claim 10, wherein iSCSI data comprise whole disk mappings and wherein the head nodes create RAID stripes across the storage nodes.

13. The system of claim 10, wherein one head node is a standby head that, upon failure of the other head node, imports all iSCSI targets, takes over a file system and virtual IP addresses and resumes operation in a fail-safe manner.

14. The system of claim 1, comprising a user interface to restore files through a group consisting of: the client software, a web based file browser replicating a look and feel of a native file explorer, and a remote data drive at the data storage silo acting as a local drive and mounted by a user.

15. The system of claim 1, wherein the web user portal includes modules to manage, configure, recover and report on data protection jobs.

16. The system of claim 1, comprising a database backup connector that automatically checkpoints a database, writes a current copy, detects and uploads sub file changes and allows for a local copy to be saved on a direct attached or network attached file system.

17. The system of claim 1, comprising a module to create and replicate NetApp snapshots and recreate the snapshots identically on (Original) The system backend service.

18. The system of claim 1, comprising a local drive synchronized with the data storage silo to maintain a local copy of back-up data.

* * * * *